US011974964B2

(12) United States Patent
Turner et al.

(10) Patent No.: US 11,974,964 B2
(45) Date of Patent: May 7, 2024

(54) PATIENT SUPPORT APPARATUS WITH INTEGRATED PATIENT THERAPY DEVICE

(71) Applicant: Hill-Rom Services, Inc., Batesville, IN (US)

(72) Inventors: Jonathan D. Turner, Batesville, IN (US); James L. Walke, Batesville, IN (US); Eric D. Benz, Batesville, IN (US); Joseph T. Canter, Harrison, OH (US); Robert M. Zerhusen, Batesville, IN (US); Michael A Knecht, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 860 days.

(21) Appl. No.: 16/829,475

(22) Filed: Mar. 25, 2020

(65) Prior Publication Data

US 2020/0306128 A1 Oct. 1, 2020

Related U.S. Application Data

(60) Provisional application No. 62/826,710, filed on Mar. 29, 2019.

(51) Int. Cl.
*A61H 9/00* (2006.01)
*A61G 7/05* (2006.01)

(52) U.S. Cl.
CPC ......... *A61H 9/0092* (2013.01); *A61G 7/0506* (2013.01); *A61G 7/0527* (2016.11); *A61H 2201/0103* (2013.01); *A61H 2201/0142* (2013.01); *A61H 2201/0146* (2013.01); *A61H 2201/0214* (2013.01);

(Continued)

(58) Field of Classification Search
CPC ........ A61H 9/00; A61H 9/005; A61H 9/0078; A61H 9/0092; A61H 2201/0103; A61H 2201/0142; A61H 2201/0214; A61H 2201/025; A61H 2201/5007; A61H 2209/00; A61H 2201/501; A61H 2201/5023; A61H 2201/5071; A61H 2203/0456; A61G 7/0527; A61G 7/0506
See application file for complete search history.

(56) References Cited

U.S. PATENT DOCUMENTS

| | | | | |
|---|---|---|---|---|
| 3,862,629 A * | 1/1975 | Rotta | .................. | F04B 43/1133 128/DIG. 20 |
| 4,149,529 A * | 4/1979 | Copeland | ............. | A61H 9/0078 607/104 |

(Continued)

FOREIGN PATENT DOCUMENTS

| | | |
|---|---|---|
| EP | 3207911 A1 | 8/2017 |
| EP | 3207911 B1 | 4/2019 |

(Continued)

OTHER PUBLICATIONS

European Search Report for Application No. EP20166503, dated Aug. 13, 2020, 8 pages.

*Primary Examiner* — Michael R Reid
*Assistant Examiner* — Tyler A Raubenstraw
(74) *Attorney, Agent, or Firm* — Barnes & Thornburg LLP

(57) ABSTRACT

A therapy system that includes a patient support apparatus and a pneumatic therapy device that is coupleable to the patient support apparatus. The therapy device may receive power and air flow from the patient support apparatus.

22 Claims, 14 Drawing Sheets

(52) U.S. Cl.
CPC .................. *A61H 2201/025* (2013.01); *A61H 2201/5007* (2013.01); *A61H 2201/501* (2013.01); *A61H 2201/5023* (2013.01); *A61H 2201/5071* (2013.01); *A61H 2203/0456* (2013.01); *A61H 2209/00* (2013.01)

(56) References Cited

U.S. PATENT DOCUMENTS 4,206,751 A * 6/1980 Schneider ............ A61H 9/0078 601/152
4,259,755 A 4/1981 Hollander
4,262,872 A 4/1981 Kodet
4,396,010 A * 8/1983 Arkans ................ A61H 9/0078 601/152
4,479,494 A * 10/1984 McEwen ............ A61B 17/1355 600/495
5,094,418 A 3/1992 Mcbarnes et al.
5,876,359 A 3/1999 Bock et al.
6,684,432 B2 2/2004 Owens, Jr.
6,829,796 B2 12/2004 Salvatini et al.
6,876,303 B2 4/2005 Reeder et al.
6,877,572 B2 4/2005 Ruschke et al.
6,987,448 B2 1/2006 Dubisar et al.
7,641,623 B2 * 1/2010 Biondo ................ A61H 9/0078 601/149
7,904,976 B2 3/2011 Hakamiun et al.
7,914,611 B2 3/2011 Vrzalik et al.
8,108,957 B2 2/2012 O'Neal et al.
8,584,279 B2 11/2013 O'Neal et al.
8,679,040 B2 3/2014 Horst
8,752,220 B2 6/2014 Soderberg et al.
8,845,562 B2 9/2014 Receveur et al.
9,017,273 B2 4/2015 Burbank et al.
9,211,227 B2 * 12/2015 Loori ..................... A61G 10/00
9,237,979 B2 1/2016 Carnell et al.
9,492,341 B2 11/2016 Huster et al.
9,642,759 B2 5/2017 Stryker et al.
9,681,980 B2 * 6/2017 Swyer ................... A61F 7/0053
9,737,454 B2 8/2017 Hornbach et al.
9,782,323 B2 10/2017 Perry et al.
9,827,157 B2 11/2017 Newkirk et al.
9,833,369 B2 12/2017 Chiacchira et al.
9,889,038 B1 * 2/2018 Cahan .................. A61H 9/0085
10,166,166 B1 1/2019 Theriot et al.
10,507,158 B2 12/2019 Brzenchek et al.
10,517,784 B2 12/2019 Zerhusen et al.
10,561,549 B2 2/2020 Walton et al.
10,667,984 B2 6/2020 Brosnan et al.
10,952,920 B2 3/2021 Brzenchek et al.
11,071,666 B2 7/2021 Emmons et al.
2002/0042583 A1 * 4/2002 Barak ..................... A61F 5/012 601/1
2003/0061664 A1 4/2003 Salvatini et al.
2004/0106884 A1 6/2004 Bolam et al.
2005/0159690 A1 * 7/2005 Barak .................. A61H 9/0078 601/149
2005/0235988 A1 * 10/2005 Hansen ................... F04B 35/06 128/200.24
2006/0004245 A1 * 1/2006 Pickett ................. A61H 9/0078 600/16
2006/0189905 A1 * 8/2006 Eischen ............... A61H 9/0085 601/151
2008/0103397 A1 * 5/2008 Barak .................. A61B 5/0285 600/492
2008/0249444 A1 * 10/2008 Avitable ................. A61H 1/008 601/152
2009/0013470 A1 1/2009 O'Neal et al.
2009/0165207 A1 * 7/2009 Reed ......................... B60T 7/10 5/608
2009/0177184 A1 7/2009 Christensen et al.
2010/0042026 A1 * 2/2010 Kloecker ............... A61H 23/04 601/149
2010/0137764 A1 * 6/2010 Eddy ...................... A61H 1/008 601/152
2010/0249679 A1 9/2010 Perry et al.
2011/0162142 A1 7/2011 Hakamiun et al.
2012/0016281 A1 1/2012 O'Neal et al.
2012/0054964 A1 * 3/2012 Stroh ................. A61G 7/05769 5/613
2012/0277789 A1 11/2012 Caldarone et al.
2013/0245519 A1 * 9/2013 Edelman .............. A61H 9/0078 601/152
2013/0338552 A1 * 12/2013 Malhi .................. A61H 9/0078 601/150
2014/0031730 A1 1/2014 Hornbach et al.
2014/0142473 A1 * 5/2014 Lowe ................... A61H 9/0092 601/84
2014/0207036 A1 7/2014 Perry et al.
2014/0276253 A1 * 9/2014 Varga ................... A61H 9/0078 601/15
2014/0276288 A1 * 9/2014 Randolph ................ A61H 9/00 601/152
2014/0276294 A1 * 9/2014 Mansur, Jr. .......... A61H 9/0078 601/152
2015/0135436 A1 5/2015 Stryker et al.
2015/0359698 A1 * 12/2015 Popovic ............... A61H 1/0277 60/530
2016/0008204 A1 * 1/2016 Elliot ................... A61B 17/135 601/152
2016/0175184 A1 * 6/2016 Arkans ................ A61H 9/0092 601/149
2017/0172838 A1 6/2017 Brosnan et al.
2017/0196763 A1 * 7/2017 Obma .................. A61H 9/0078
2017/0239131 A1 * 8/2017 Brzenchek ........... A47C 21/048
2017/0273851 A1 9/2017 Larmer et al.
2018/0042763 A1 * 2/2018 Galer ................... A61H 9/0078
2018/0272147 A1 9/2018 Freeman et al.
2018/0369039 A1 12/2018 Titov et al.
2019/0000329 A1 1/2019 Denson et al.
2019/0015289 A1 1/2019 Grimoldby et al.
2019/0021924 A1 1/2019 Trepanier et al.
2019/0125619 A1 * 5/2019 Zeutzius .............. A61H 9/0078
2020/0060925 A1 2/2020 Brzenchek et al.
2020/0113773 A1 * 4/2020 Ramanan ............. A61H 9/0092
2020/0121546 A1 * 4/2020 Theriot ................ A61H 9/0092
2020/0253813 A1 * 8/2020 Kuhns .................. A61H 9/0092
2020/0306129 A1 10/2020 Franklin et al.

FOREIGN PATENT DOCUMENTS

EP 3714857 A1 9/2020
KR 1020090004859 A 1/2009
KR 20090004859 U 5/2009
WO 0206673 A1 1/2002
WO 2004091463 A2 10/2004
WO 2014066077 A1 5/2014
WO WO-2016003859 A1 * 1/2016 ........... A61H 9/0078
WO 2016123595 A1 8/2016
WO WO-2019145946 A1 * 8/2019 ........... A61F 13/085

* cited by examiner

NAVICARE STATUS BOARD

| ROOM | PATIENT | PPM | RAILS | SCD? |
|---|---|---|---|---|
| 100 | SMITH, MARY | ✓ | ✗ | ✓ |
| 102 | WU, SHANNON | | ✓ | ✓ |
| 104 | JONES, RON | ✓ | ✓ | ✗ |

PATIENT SUPPORT APPARATUS WITH INTEGRATED PATIENT THERAPY DEVICE

CROSS-REFERENCE TO RELATED APPLICATIONS

This application claims priority under 35 U.S.C. § 119(e) to U.S. Provisional Application No. 62/826,710, filed Mar. 29, 2019, which is expressly incorporated by reference herein.

BACKGROUND

The present disclosure relates to patient support apparatuses such as patient beds and particularly, to patient support apparatuses that have therapy devices. More particularly, the present disclosure relates to patient support apparatuses that have integrated limb compression devices.

Patient support apparatuses, such as patient beds, are used in patient rooms to support sick patients and to support patients recovering from surgery, for example. It is desirable for some patients to wear limb compression sleeves, such as foot sleeves, calf sleeves, thigh sleeves, or a combination of these sleeves. The sleeves are inflated and deflated intermittently to promote blood flow within the patient's limb or limbs thereby helping to prevent deep vein thrombosis, for example. Usually, a separate control box which houses the pneumatic components that operate to inflate and deflate the compression sleeve(s) worn by the patient is provided.

Oftentimes, the control box for the compression sleeve(s) is hung on the footboard of the patient bed. Thus, there is a risk that the control box can slip off of the footboard. Also, relatively long power cords are required to be routed from the control box at the foot end of the bed to a power outlet near the head end of the bed or elsewhere in the patient room. The foot ends of patient beds are typically oriented more toward the center of a room and not adjacent to any room wall. The power cord, therefore, may pose a tripping hazard for caregivers, patients, and visitors. The power cord also may be in the way of other carts or wheeled stands, such as those used to support IV pumps and bags, for example. When not in use, the control box must be stored separately within a healthcare facility.

There is an ongoing need to reduce the labor required for caregivers to deliver quality patient care. Further, there is an ongoing need for the cost of healthcare to be reduced. Finally, the comfort of a person in a clinical environment is directly related to their perception of the quality of their care and their recovery. A therapy system that provides patient comfort, reduced cost, and improved caregiver efficiency addresses the aforementioned needs.

SUMMARY

The present application discloses one or more of the features recited in the appended claims and/or the following features which, alone or in any combination, may comprise patentable subject matter.

According to a first aspect of the present disclosure, a therapy system comprises a pneumatic therapy device and a patient support apparatus. The pneumatic therapy device includes a compression sleeve and a conduit having a first end coupled to the compressions sleeve and a second end. The patient support apparatus, the patient support apparatus includes a frame, a source of pressurized air supported by the frame, a distribution assembly, a user interface, and a controller. The distribution assembly includes a conduit for directing a flow of pressurized air from the source of pressurized air, an outlet, and a sensor for detecting a pressure. The user interface is supported on the frame. The controller includes a processor and a memory device. The memory device includes instructions that are executable by the processor to control the source of pressurized air, distribution system, and user interface, the instructions operable to detect that the second end of the conduit of the pneumatic therapy assembly has been connected to the outlet of the distribution assembly and provide an interface screen on the user interface to allow a user to control of the source of pressurized air to operate the pneumatic therapy device to provide therapy to an occupant of the patient support apparatus.

In some embodiments of the first aspect, the outlet of the distribution assembly may be positioned on an edge of the frame of the patient support apparatus.

In some embodiments of the first aspect, the patient support apparatus may further comprise a mattress and the outlet of the distribution assembly is positioned on an edge of the mattress of the patient support apparatus.

In some embodiments of the first aspect, the instructions in the memory device may include instructions that, when executed by the processor, cause the controller to monitor the sensor for detecting a pressure in the distribution assembly to detect that the second end of the conduit of the therapy device has been connected to the outlet.

In some embodiments of the first aspect, the patient support apparatus may further comprise a sensor operable to detect a token coupled to the second end of the conduit of the pneumatic therapy device to determine the type of therapy device coupled to the outlet of the air distribution assembly.

In some embodiments of the first aspect, the memory device may include instructions that, when executed by the processor, cause the controller to monitor the pressure in the pneumatic therapy device at pre-determined intervals of time, determine if the measured pressure is greater than a pre-programmed threshold, and if the pressure exceeds the pre-programmed threshold, records a violation in the patient record, and decreases the pressure by a predetermined value.

In some embodiments of the first aspect, the memory device may include further instructions that, when executed by the processor, cause the controller to transmit an alert to a caregiver providing an indication of the violation of the pre-programmed threshold.

In some embodiments of the first aspect, the memory device may include further instructions that, when executed by the processor, cause the controller to monitor the sensor for detecting a pressure in the distribution assembly to detect that the second end of the conduit of the therapy device has been disconnected from the outlet.

In some embodiments of the first aspect, the memory device includes further instructions that, when executed by the processor, cause the controller to transmit an alert to a caregiver providing an indication of the conduit is disconnected.

In some embodiments of the first aspect, the patient support apparatus may include a scale system and the memory device may include instructions that, when executed by the processor, cause the controller to modify an operating parameter of the pneumatic therapy device based on a weight of a patient on the patient support apparatus as detected by the scale system.

In some embodiments of the first aspect, the patient support apparatus may be in communication with a communication interface that communicates data regarding the operation of the pneumatic therapy device to a computer spaced apart from the patient support apparatus.

In some embodiments of the first aspect, the air distribution assembly may include a manifold that is positioned on the frame of the patient support apparatus.

In some embodiments of the first aspect, the source of pressurized air may positioned on the frame and enclosed by a mattress.

In some embodiments of the first aspect, the source of pressurized air may be positioned on the frame and at least a portion of the source of pressurized air may be positioned in a mattress supported on the frame.

In some embodiments of the first aspect, the source of pressurized air may be positioned in a footboard positioned on the frame of the patient support apparatus.

In some embodiments of the first aspect, the source of pressurized air may be removeably coupled to a footboard positioned on the frame of the patient support apparatus.

In some embodiments of the first aspect, the outlet of the air distribution assembly may be positioned on an edge of the footboard.

In some embodiments of the first aspect, the air distribution assembly may be contained within the footboard.

In some embodiments of the first aspect, the compression sleeve may include an exterior surface, a body formed of low air-loss material, and a liner of porous material to allow air to enter the porous material and cool a patient's skin while applying compression therapy and wherein the compression sleeve may include a bladder and a check-valve coupled to an outlet of the bladder, the check valve in fluid communication with the low air-loss material such that once the threshold pressure of the check valve is reached, the check-valve permits a flow of pressurized air to exit the bladder and feed the low air-loss material.

According to a second aspect of the present disclosure, a therapy system comprises a pneumatic therapy device, a source of pressurized air positioned in a headwall of a room, and a patient support apparatus. The pneumatic therapy device includes a compression sleeve and a conduit having a first end coupled to the compressions sleeve and a second end. The patient support apparatus, the patient support apparatus includes a frame, a distribution assembly, a user interface, and a controller. The distribution assembly including a conduit for directing a flow of pressurized air from the source of pressurized air, an outlet, and a sensor for detecting a pressure. The user interface is supported on the frame. The controller includes a processor and a memory device. The memory device includes instructions that are executable by the processor to control the source of pressurized air, distribution system, and user interface The instructions are operable to detect that the second end of the conduit of the pneumatic therapy assembly has been connected to the outlet of the distribution assembly and provide an interface screen on the user interface to allow a user to control the flow from the source of pressurized air to operate the pneumatic therapy device to provide therapy to an occupant of the patient support apparatus.

In some embodiments of the second aspect of the disclosure, the outlet of the distribution assembly may be positioned on an edge of the frame of the patient support apparatus.

In some embodiments of the first aspect, the instructions in the memory device may include instructions that, when executed by the processor, monitor the sensor for detecting a pressure in the distribution system to detect that the second end of the conduit of the therapy device has been connected to the outlet.

In some embodiments of the first aspect, the patient support apparatus may further comprise a sensor operable to detect a token coupled to the second end of the conduit of the pneumatic therapy device to determine the type of therapy device coupled to the outlet of the air distribution assembly.

In some embodiments of the first aspect, the memory device may include instructions that, when executed by the processor, cause the controller to monitor the pressure in the pneumatic therapy device at pre-determined intervals of time, determine if the measured pressure is greater than a pre-programmed threshold, and if the pressure exceeds the pre-programmed threshold, records a violation in the patient record, and decreases the pressure by a predetermined value.

In some embodiments of the first aspect, the memory device may include further instructions that, when executed by the processor, cause the controller to transmit an alert to a caregiver providing an indication of the violation of the pre-programmed threshold.

In some embodiments of the first aspect, the memory device may include further instructions that, when executed by the processor, monitor the sensor for detecting a pressure in the distribution system to detect that the second end of the conduit of the therapy device has been disconnected from the outlet.

In some embodiments of the first aspect, the memory device may include further instructions that, when executed by the processor, cause the controller to transmit an alert to a caregiver providing an indication of the conduit is disconnected.

In some embodiments of the first aspect, the patient support apparatus may include a scale system and the memory device may include instructions that, when executed by the processor, modify an operating parameter of the pneumatic therapy device based on a weight of a patient on the patient support apparatus as detected by the scale system.

In some embodiments of the first aspect, the patient support apparatus may be in communication with a communication interface that communicates data regarding the operation of the pneumatic therapy device to a computer spaced apart from the patient support apparatus.

In some embodiments of the first aspect, the air distribution assembly may include a manifold that is positioned on the frame of the patient support apparatus.

According to a third aspect of the present disclosure, therapy system comprises a pneumatic therapy device, a patient support surface, and a patient support apparatus. The pneumatic therapy device includes a compression sleeve having a first portion of a selectively releasable fastener and a conduit if fluid communication with the compression sleeve. The patient support surface includes a second portion of the selectively releasable fastener, the first portion engageable on the compression sleeve engageable with the second portion to secure the pneumatic therapy device to the patient support surface. The patient support apparatus supports the patient support surface and includes a source of pressurized air, a distribution assembly, a user interface, and a controller. The distribution assembly includes a conduit for directing a flow of pressurized air from the source of pressurized air, an outlet, and a sensor for detecting a pressure, a user interface supported on the frame. The controller includes a processor and a memory device. The memory device includes instructions that are executable by the processor to control the source of pressurized air, distribution system, and user interface. The instructions are operable to provide an interface screen on the user interface to allow a user to control of the source of pressurized air to operate the pneumatic therapy device to provide therapy to an occupant of the patient support apparatus.

In some embodiments of the third aspect, the patient support surface may include a bladder and the source of pressurized air is configured to inflate the bladder of the patient support surface.

In some embodiments of the third aspect, the outlet of the distribution assembly may be positioned on an edge of the patient support surface.

In some embodiments of the third aspect, the instructions in the memory device may include instructions that, when executed by the processor, monitor the sensor for detecting a pressure in the distribution system to detect that the second end of the conduit of the therapy device has been connected to the outlet.

In some embodiments of the third aspect, the patient support apparatus may further comprise a sensor operable to detect a token coupled to the second end of the conduit of the pneumatic therapy device to determine the type of therapy device coupled to the outlet of the air distribution assembly.

In some embodiments of the third aspect, the patient support apparatus may further comprise a sensor operable to detect a token coupled to the second end of the conduit of the pneumatic therapy device to determine the type of therapy device coupled to the outlet of the air distribution assembly.

In some embodiments of the third aspect, the memory device may include instructions that, when executed by the processor, cause the controller to monitor the pressure in the pneumatic therapy device at pre-determined intervals of time, determine if the measured pressure is greater than a pre-programmed threshold, and if the pressure exceeds the pre-programmed threshold, records a violation in the patient record, and decreases the pressure by a predetermined value.

In some embodiments of the third aspect, the memory device may include further instructions that, when executed by the processor, cause the controller to transmit an alert to a caregiver providing an indication of the violation of the pre-programmed threshold.

In some embodiments of the third aspect, the memory device may include further instructions that, when executed by the processor, monitor the sensor for detecting a pressure in the distribution system to detect that the second end of the conduit of the therapy device has been disconnected from the outlet.

In some embodiments of the third aspect, the memory device may include further instructions that, when executed by the processor, cause the controller to transmit an alert to a caregiver providing an indication of the conduit is disconnected.

In some embodiments of the third aspect, the patient support apparatus may include a scale system and the memory device includes instructions that, when executed by the processor, modify an operating parameter of the pneumatic therapy device based on a weight of a patient on the patient support apparatus as detected by the scale system.

In some embodiments of the third aspect, the patient support apparatus may be in communication with a communication interface that communicates data regarding the operation of the pneumatic therapy device to a computer spaced apart from the patient support apparatus.

According to a fourth aspect of the present disclosure, a therapy system comprises a patient support apparatus. The patient support apparatus includes a frame, a patient support surface, a user interface, an air system, a pneumatic therapy device, and a coupler. The frame is formed to include a left edge, and a right edge spaced apart from the left side. The patient support surface is supported on the frame, the patient support surface formed to include a head section, a foot section spaced apart from the head section, and a body section extending therebetween. The air system includes a source of pressurized air, and an outlet coupled to the source of pressurized air. The coupler is configured to removeably pneumatically connect the pneumatic therapy device to the air system to receive air from the source of pressurized air. The air system further includes a plurality of distribution conduits coupled to and extending away from the outlet, at least two of the plurality of distribution conduits extending along the left side of the frame and at least two of the plurality of distribution conduits extending along the right side of the frame, each of the distribution conduits coupleable to the pneumatic therapy device.

In some embodiments of the fourth aspect, the frame may be formed to integrally include the outlet.

In some embodiments of the fourth aspect, the pneumatic therapy device may draw power from the patient support apparatus to operate the pneumatic therapy device and the air system, the air system provides pressurized air to the patient support apparatus and the pneumatic therapy device.

In some embodiments of the fourth aspect, a pair of ports may be formed in each of the left edge and the right edge of the frame and couple the pneumatic therapy device to the air system.

In some embodiments of the fourth aspect, the air system may further include an air system controller integrally formed in the frame and in communication with the source of pressurized air, the outlet and the pneumatic therapy device, the air system controller detects the connection of the pneumatic therapy device to the air system, identify the port at which the pneumatic therapy device is detected, and initiate operation of the therapy system to achieve and maintain a desired pressure within the pneumatic therapy device.

In some embodiments of the fourth aspect, the air system controller may identify the simultaneous coupling of the pneumatic therapy device to the pair of ports formed in the left edge or the right edge and communicate the location of the coupling to the source of pressurized air, the source of pressurized air receives information and directions from the air system controller to maintain the desired pressure within the pneumatic therapy device and guide pressurized air towards the pair of ports to which the pneumatic therapy device is detected.

In some embodiments of the fourth aspect, the air system controller may update the user interface to provide access to the air system controller to control operation of the pneumatic therapy device from the user interface.

In some embodiments of the fourth aspect, the pneumatic therapy device may be a sequential compression device (SCD) assembly.

In some embodiments of the fourth aspect, the pneumatic therapy device may further comprise an at least one sleeve engages an occupant, and an at least one hose having a first end, and a second end spaced apart from the first end. The at least one hose may removeably couple to the sleeve at the first end of the at least one hose and to the coupler at the second end of the at least one hose, the at least one hose directs a pressurized airstream from the air system to the sleeve.

In some embodiments of the fourth aspect, the frame may be further formed to couple to a headwall spaced apart from the frame and extending between the left edge and the right edge of the patient support apparatus at the head end of the patient support surface and a footboard spaced apart from the headwall and extending between the left edge and the right edge of the patient support apparatus at the foot end of the patient support surface, the headwall formed to integrally include the source of pressurized air.

In some embodiments of the fourth aspect, the air system may further includes an air regulator coupled to the frame and at least one pneumatic tube extending between the source of pressurized air and the air regulator, the air regulator adjusts the pressurized air to a level at which the pneumatic therapy device is operable.

In some embodiments of the fourth aspect, the outlet may be formed to include a plurality of solenoid valves regulate the pressure of the pneumatic therapy device and a vent positioned downstream of at least one of the plurality of solenoid valves, the vent releases a portion of the adjusted pressurized air not used to maintain the desired pressure of the pneumatic therapy device.

In some embodiments of the fourth aspect, the patient support surface may be formed to include the outlet and the source of pressurized air is coupled to the frame.

In some embodiments of the fourth aspect, the head section of the patient support surface may be formed to include the outlet and the foot section of the patient support surface is formed to include the source of pressurized air.

In some embodiments of the fourth aspect, the frame is further formed to include a headboard extending between the left edge and the right edge of the patient support apparatus at the head end of the patient support surface and a footboard spaced apart from the headboard and extending between the left edge and the right edge of the patient support apparatus at the foot end of the patient support surface, the footboard formed to integrally include the source of pressurized air and the outlet coupled thereto.

In some embodiments of the fourth aspect, the air system may further include a housing formed to house the source of pressurized air and the distribution manifold therein.

In some embodiments of the fourth aspect, the housing may be positioned adjacent to the foot section of the patient support surface and extends between a left edge and a right edge of the frame.

In some embodiments of the fourth aspect, the housing may be formed to include a left side and a right side spaced apart from each other, the left side and the right side formed to integrally include a pair of ports coupleable to the pneumatic therapy device.

In some embodiments of the fourth aspect, the patient support surface may include a top surface engageable with a patient and a bottom surface spaced apart from the top surface and formed to include a recess therein, the recess formed to receive the housing.

In some embodiments of the fourth aspect, the housing is positioned below the foot section of the patient support surface and coupled to the frame.

In some embodiments of the fourth aspect, the frame may be further formed to include a headboard extending between the left edge and the right edge of the patient support apparatus at the head end of the patient support surface and a footboard spaced apart from the headboard and extending between the left edge and the right edge of the patient support apparatus at the foot end of the patient support surface, the air system removeably coupled to the footboard and moveable between a plurality of patient support apparatuses.

In some embodiments of the fourth aspect, the footboard may be formed to expose a plurality of pneumatic ports coupleable to the air system and direct air produced by the pressurized air source through the footboard towards the pneumatic therapy device.

In some embodiments of the fourth aspect, the air system may further include an air system controller in communication with the main controller, the source of pressurized air, and the outlet, the air system controller may comprise a processor, and a memory device.

According to a fifth aspect of the present disclosure, a compression sleeve includes an exterior surface, a body formed of low airloss material, and a liner of porous material to allow air to enter the porous material and cool a patient's skin while applying compression therapy.

In some embodiments of the fifth aspect, the compression sleeve may include an inlet for pressurized air to flow directly into the low airloss material.

In some embodiments of the fifth aspect, the compression sleeve may comprise a bladder and a check-valve coupled to an outlet of the bladder, the check valve in fluid communication with the low airloss material such that once the threshold pressure of the check valve is reached, the check-valve permits a flow of pressurized air to exit the bladder and feed the low airloss material.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
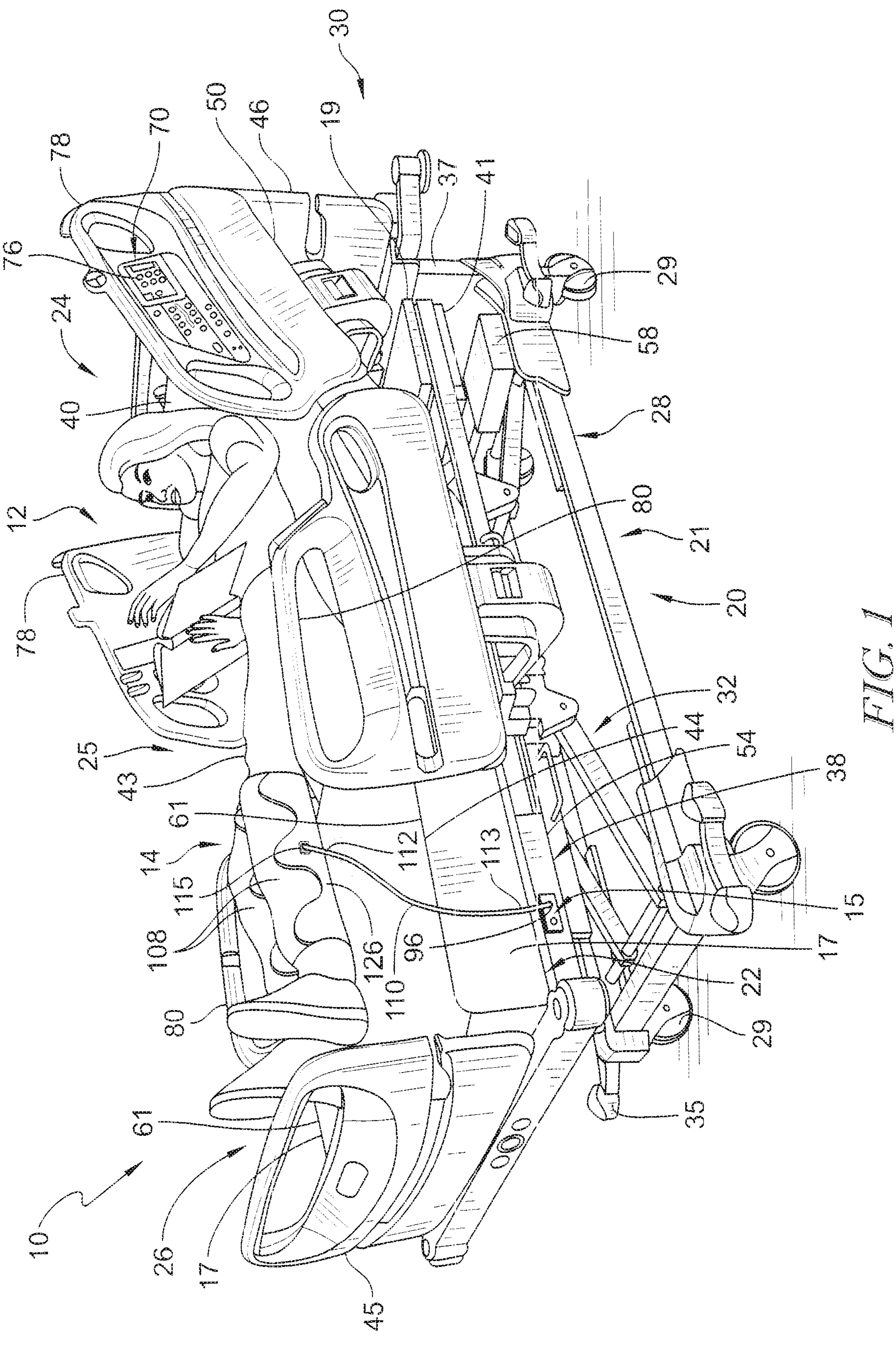
FIG. 1 is a perspective view of a patient support apparatus illustratively embodied as a hospital bed and showing a patient lying on the bed with compression sleeves positioned on the patient's lower limbs and further showing a foot section of a frame of the hospital bed having ports for coupling a conduit thereto, the conduit extending between the port and the compression sleeve to guide pressurized fluid between the patient support and the compression sleeves.
Figure 2:
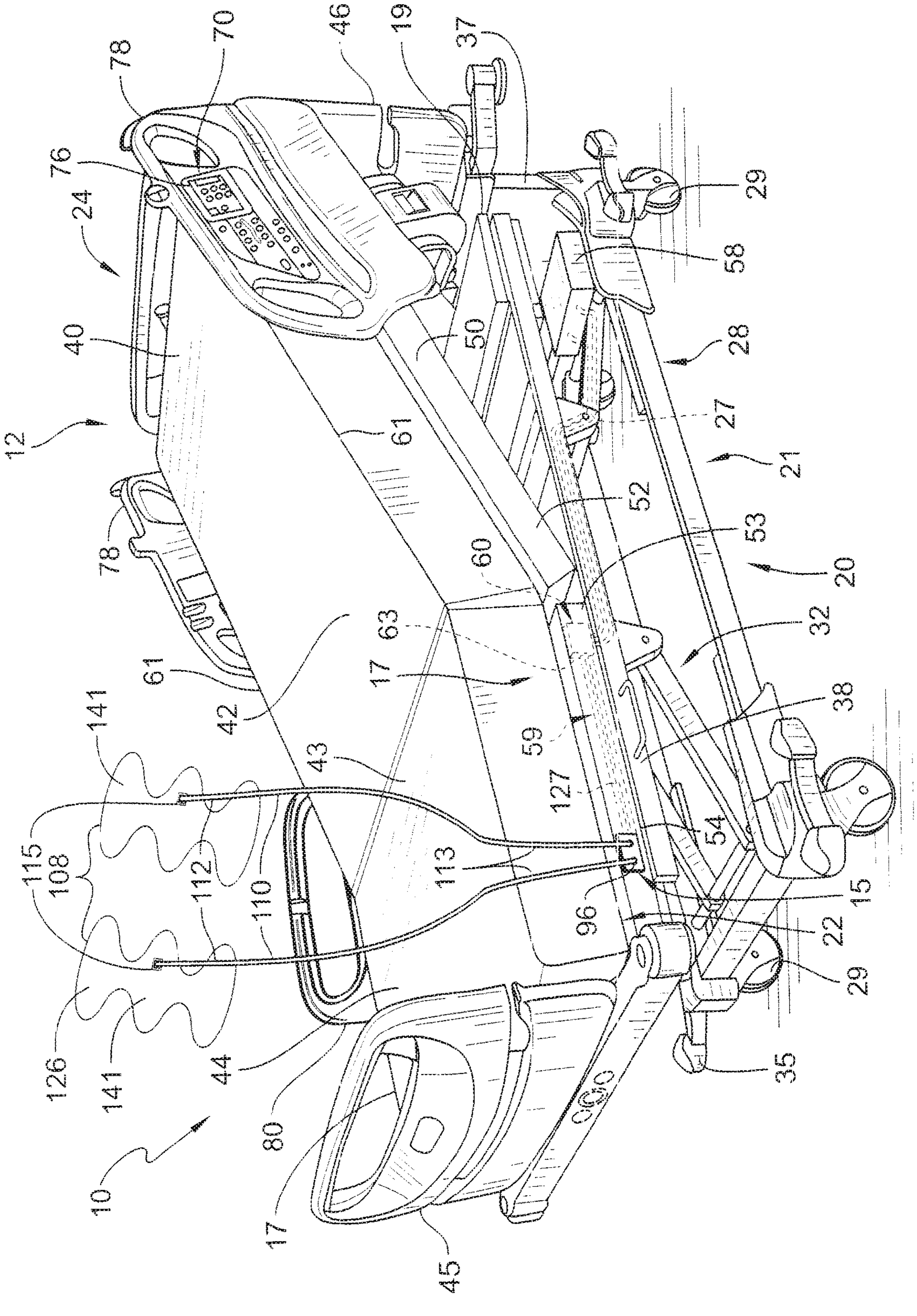
FIG. 2 is a perspective view of the patient support apparatus of FIG. 1 showing a portion of the air system of the bed coupled to the frame of the patient support apparatus and in communication with the conduit and compression sleeve(s) (together forming a pneumatic therapy device) coupled thereto.

In one embodiment of a therapy system 10, the system 10 includes a patient support apparatus 12 and a pneumatic therapy device 14 configured to couple to the patient support apparatus 12. The patient support apparatus 12, illustratively embodied as a hospital bed 12, includes a patient support structure 21 such as a frame 21 that supports a surface or mattress 22 as shown in FIGS. 1 and 2. While the patient support apparatus 12 is embodied as a hospital bed 12, this disclosure is applicable to other types of patient support apparatuses, including other types of beds, surgical tables, examination tables, stretchers, and the like. As will be described below in further detail, a main controller 18 (shown in FIG. 3) of patient support apparatus 12 is operable to control operation of pneumatic therapy device 14 using an air system 20 of patient support apparatus 12.

Pneumatic therapy device 14 is illustratively embodied as a sequential compression device assembly (SCD assembly) 14, as shown in FIGS. 1 and 2, although a variety of other pneumatic therapy devices known in the art may be used in addition to/in place of SCD assembly 14. As such, pneumatic therapy device and SCD assembly 14 are used interchangeably throughout the application. Pneumatic therapy device 14 disclosed herein utilizes an air source 58 of air system 20 coupled to patient support apparatus 12, shown diagrammatically in FIGS. 3 and 4, and is formed to include one or more compression sleeves 108 that are placed upon a patient's limbs as shown, for example, in FIG. 1. Air source, air supply, and source for pressurized air are used interchangeably throughout the application. In some embodiments, sleeves 108 are embodied as wraps that are sized to wrap about a patient's calves, thighs, and/or feet. Combination sleeves (not shown) that attach to a patient's calves and feet or that attach to a patient's calves and thighs or that attach to a patient's feet, calves and thighs are within the scope of this disclosure. Upper limb sleeves (not shown) removeably coupleable to a patient's arms and/or torso are also within the scope of this disclosure. However, sleeves 108 that attach to the patient's lower limbs are the ones that are most commonly used in sequential compression device assembly 14, particularly, for the prevention of deep vein thrombosis (DVT).

The SCD assemblies 14 disclosed herein are sometimes referred to as limb compression devices, intermittent compression devices (ICDs), DVT prevention systems, or the like. Thus, these terms and variants thereof are used interchangeably herein to cover all types of devices and systems that have compression sleeves with one or more inflatable and deflatable chambers that are controlled pneumatically by delivery and removal of air or other gas from a set of pneumatic components that are contained within patient support apparatus 12.

Referring to FIGS. 1 and 2, frame 21 of patient support apparatus 12 includes a lower frame or base 28, an upper frame assembly 30, and a lift system 32 coupling upper frame assembly 30 to base 28. Lift system 32 is operable to raise, lower, and tilt upper frame assembly 30 relative to base 28. Patient support apparatus 12 has a head end 24 and a foot end 26 spaced apart from each other with a body section 25 extending therebetween. Patient support apparatus 12 further includes a footboard 45 coupled to patient support apparatus 12 at foot end 26, a headboard 46 coupled to patient support apparatus 12 at head end 24, and a pair of sides 17 spaced apart from each other and extending laterally from foot end 26 to head end 24 of patient support apparatus 12. Headboard 46 is coupled to an upstanding portion 37 of base 28. Footboard 45 is removeably coupled to an extendable and retractable portion 47 of a foot section 54 of a patient support deck 38 of upper frame assembly 30. In other embodiments, footboard 45 is coupled to a foot end 39 of upper frame assembly 30. Illustratively, base 28 includes a plurality of wheels or casters 29 that roll along a floor as patient support apparatus 12 is moved from one location to another. A set of foot pedals 35 are coupled to base 28 and are used to brake and release casters 29 as is known in the art.

Illustrative patient support apparatus 12 has four siderail assemblies coupled to upper frame assembly 30 as shown in FIG. 1. The four siderail assemblies include a pair of head siderail assemblies 78 (sometimes referred to as head rails) and a pair of foot siderail assemblies 80 (sometimes referred to as foot rails). Each of the siderail assemblies 78, 80 is movable between a raised position, as shown in FIG. 1, and a lowered position (not shown but well-known to those skilled in the art). Siderail assemblies 78, 80 are sometimes referred to herein as siderails 78, 80.

Upper frame assembly 30 includes a patient support deck 38 that supports mattress 22. Patient support deck 38 is situated over an upper frame 19 of upper frame assembly 30. Mattress 22 includes a head section 40, a seat section 42, a thigh section 43, and a foot section 44 in the illustrative example as shown in FIGS. 1 and 2. Patient support deck 38 is formed to include a head section 50, a seat section 52, a thigh section 53, and a foot section 54 such that respective mattress sections 40, 42, 43, 44 are positioned thereon. Mattress sections 40, 42, 43, 44 are each movable relative to upper frame 19. For example, head section 40 pivotably raises and lowers relative to seat section 42 whereas foot section 54 pivotably raises and lowers relative to thigh section 43. Additionally, thigh section 53 articulates relative to seat section 42.

Mattress 22 further includes a pair of edges 61 wherein each of the pair of edges 61 is spaced apart from each other with respective section 40, 42, 43, 44 extending therebetween. In the illustrative embodiment, thigh section 43 and/or foot section 44 is configured to support SCD assembly 14 when independent of the patient as well as when coupled thereto. As will be discussed below, in some embodiments, thigh section 43 and/or foot section 44 may be formed to integrally include SCD assembly 14 and/or be configured to store SCD assembly 14 therein when not in use, when patient is ambulatory, and/or to avoid SCD assembly 14 from contacting a floor of a hospital/care center.

Figure 3:
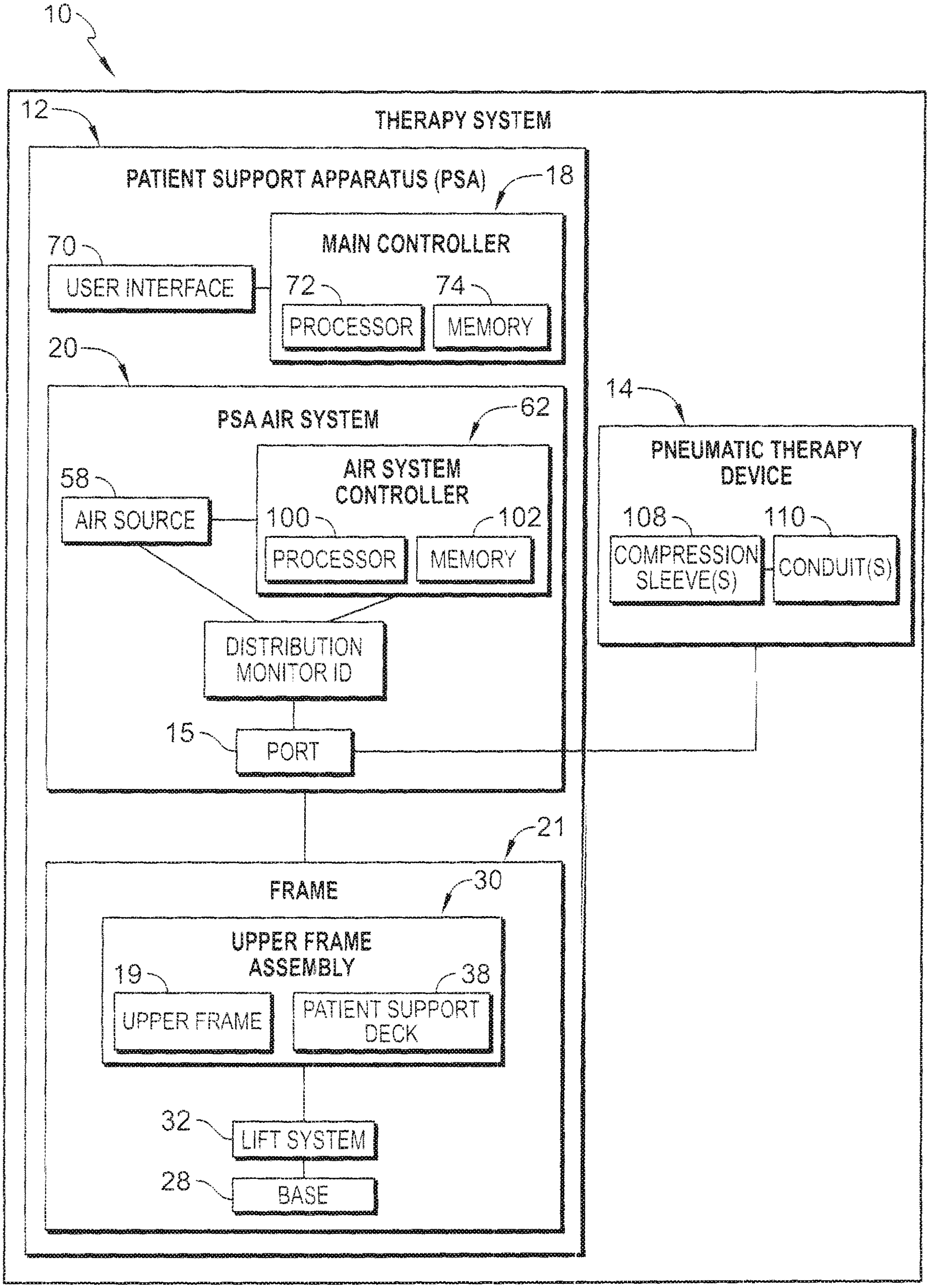
FIG. 3 is a block diagram showing the pneumatic components of the bed of FIG. 1 and showing the pneumatic therapy device of FIG. 2 in communication with the air system of the patient support apparatus.
Figure 4:
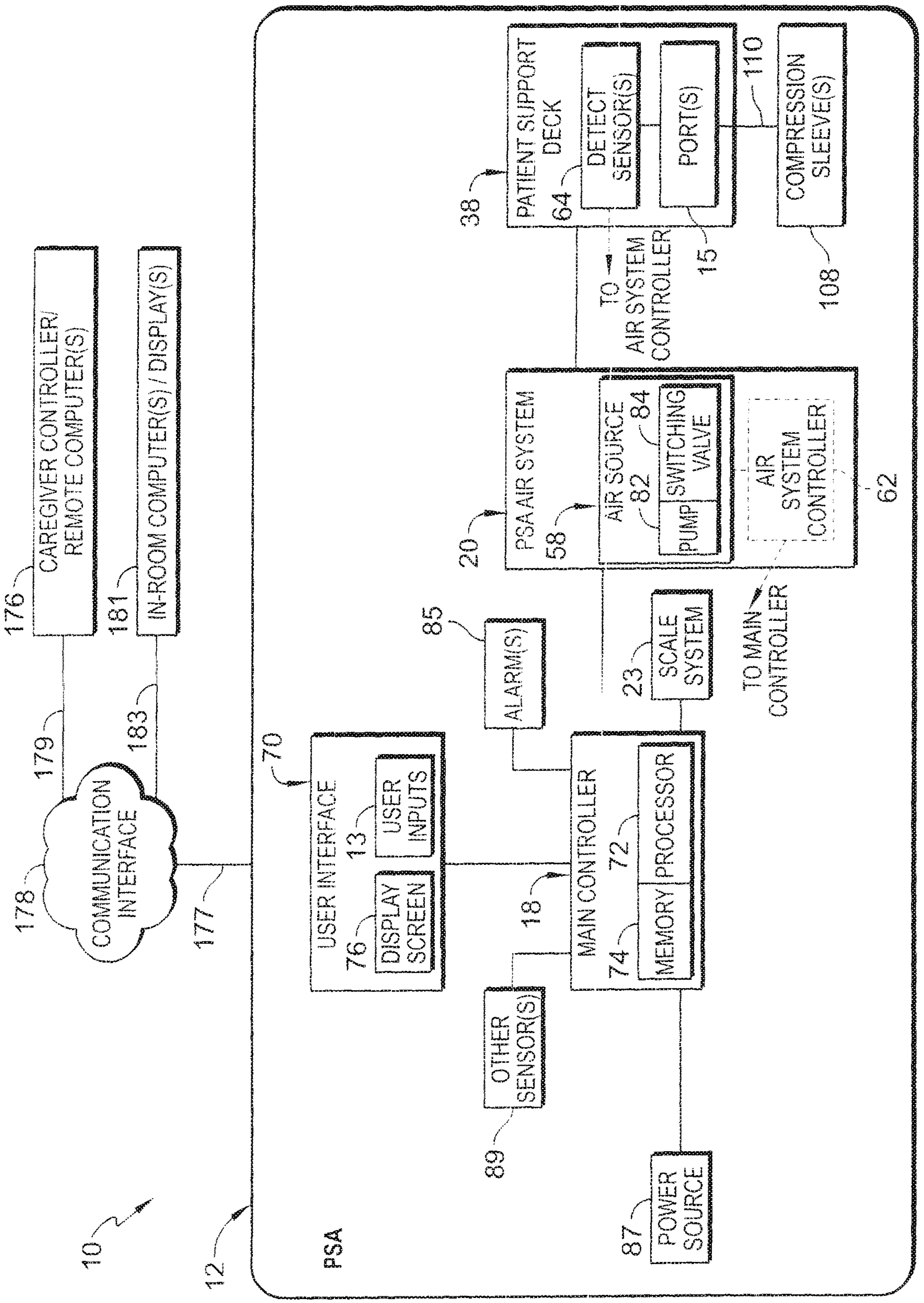
FIG. 4 is a block diagram showing the electric and communication components of the bed of FIG. 1 and showing the compression sleeve(s) and conduit in communication with an air system controller configured to communicate with a main controller of the patient support apparatus.

Referring to FIGS. 3 and 4, when in use, SCD assembly 14 is configured to communicate with main controller 18 electrically coupled to air system 20 and a user interface 70. Main controller 18 may be formed to include various circuit boards, electronics modules, and the like that are electrically and communicatively interconnected. Main controller 18 includes one or more microprocessors or microcontrollers 72 that execute software to perform the various bed control functions and algorithms along with compression device control functions and algorithms as described herein. Thus, main controller 18 also includes memory 74 for storing software, variables, calculated values, and the like as is known in the art.

As shown diagrammatically in FIG. 4, main controller 18 includes a processor 72 and a memory device 74 that stores instructions and/or algorithms used by processor 72. Processor 72 executes the instructions and algorithms stored in memory 74 to perform the various bed control functions and algorithms along with SCD assembly 14 functions and algorithms described herein.

Main controller 18 is further configured to be in communication with user interface 70. User interface 70 is configured to receive user inputs by the caregiver and/or patient, to communicate such input signals to main controller 18 of patient support apparatus 12 to control the operation of air system 20 and SCD assembly 14 of patient support apparatus 12, and to control the operation of other functions of patient support apparatus 12. User interface 70 is further configured to provide access to air system controller 62 to control operation of SCD assembly 14 from user interface 70. User interface 70 may be formed as a graphical user input (GUI) or display screen 76 coupled to a respective siderail 78 as shown in FIGS. 1 and 2. Display screen 76 is coupled to main controller 18 as shown diagrammatically in FIG. 4. In some embodiments, two GUI's 76 are provided and are coupled to head siderails 78. Alternatively or additionally, one or more GUI's are coupled to foot siderails 80 and/or to one or both of the headboard 46 and footboard 45. Alternatively or additionally, GUI 76 is provided on a hand-held device such as a tablet, phone, pod or pendant that communicates via a wired or wireless connection with main controller 18.

As such, main controller 18 is configured to act on information provided by user interface 70 to control air system 20 based on inputs from a user. For example, user interface 70 includes a user input device (not shown) that is indicative of when a user wishes to actuate therapy of SCD assembly 14. The user input device corresponds to sequential compression of SCD assembly 14. Similarly, the user input device provides a signal to main controller 18 that therapy provided by SCD assembly 14 is to be halted when the user input device provides a signal indicative of a user's desire to stop sequential compression of SCD assembly 14. As such, user input devices may signal/indicate that the sequential compression of the respective SCD assembly 14 is to be actuated and/or ceased.

In some embodiments, main controller 18 of patient support apparatus 12 communicates with a caregiver controller/remote computer device 176 via a communication infrastructure 178 such as a wired network of a healthcare facility in which patient support apparatus 12 is located and/or via communications links 177, 179 as shown diagrammatically in FIG. 4. Infrastructure 178 may be operated according to, for example, wired and/or a wireless links. Caregiver controller 176 is sometimes simply referred to as a "computer" or a "server" herein. In some embodiments, main controller 18 of patient support apparatus 12 communicates with one or more in-room computers or displays 181 via communication infrastructure 178 and communications link 183. In some embodiments, display 181 is an in-room station or a nurse call system.

Remote computer 176 may be part of a bed data system, for example. Alternatively or additionally, it is within the scope of this disclosure for circuitry (not shown) of patient support apparatus 12 to communicate with other computers 176 and/or servers such as those included as part of an electronic medical records (EMR) system, a nurse call system, a physician ordering system, an admission/discharge/transfer (ADT) system, or some other system used in a healthcare facility in other embodiments, although this need not be the case.

In the illustrative embodiment, patient support apparatus 12 has a communication interface which provides bidirectional communication via link 177 with infrastructure 178 which, in turn, communicates bidirectionally with computers 176, 181 via links 179, 183 respectively as shown in FIG. 4. Link 177 is a wired communication link in some embodiments and is a wireless communications link in other embodiments. Furthermore, communications links 179, 183 each comprises one or more wired links and/or wireless links as well, according to this disclosure. Remote computer 176 may be part of a bed data system, for example. Alternatively or additionally, it is within the scope of this disclosure for the circuitry of patient support apparatus 12 to communicate with other computers 176 and/or servers such as those included as part of the EMR system, a nurse call system, a physician ordering system, an admission/discharge/transfer (ADT) system, or some other system used in a healthcare facility in other embodiments, although this need not be the case.

Still referring to FIG. 4, main controller 18 is in communication with a scale system 23 coupled to frame 21 that may be operable to determine a weight of the patient positioned on patient support apparatus 12. Main controller 18 may vary an operating parameter of therapy system 10 depending upon the weight of the patient sensed by scale system 23. Scale system 23, using load cells, is used to detect the weight of a patient positioned on the patient support apparatus 12, movement of the patient on patient support apparatus 12, and/or the exit of the patient from patient support apparatus 12. Other sensors may be used in conjunction with or as an alternative to the load cells of the scale system 23, including, for example, force sensitive resistors (FSRs) that are placed beneath the mattress 22 of the patient support apparatus 12 on the patient support deck 38.

As shown in FIG. 4, patient support apparatus 12 has one or more alarms 85. Such alarms 85 may be one or more audible alarms and/or visual alarms coupled to the circuitry. Audible alarms 85 include, for example, a speaker, piezoelectric buzzer, or the like. The circuitry controls audible alarms 85 to sound in response to various alarm conditions detected. Visual alarms 85 include, for example, one or more alert lights that are provided on frame 21 of patient support apparatus 12 and that are activated in different ways to indicate the conditions of patient support apparatus 12. For example, when no alerts or alarms exist, the lights are activated to shine green. When an alert or alarm occurs, including a bed exit alarm, lights are activated to shine red or amber and, in some embodiments, to blink. Other visuals alarms that may be used in addition to, or instead of, such alert lights include changing a background color of graphical display screen 76 and/or displaying an iconic or textual alarm message on display screen 76 and may even include IV pole mounted or wall mounted devices such as lights and/or graphical display screens.

It should be understood that FIG. 4 is diagrammatic in nature and that various portions of patient support apparatus 12 and the circuitry thereof is not depicted. However, a power source block 87 is intended to represent an onboard battery of patient support apparatus 12 and an AC power cord of patient support apparatus 12 as well as the associated power handling circuitry. Also, the block representing other sensors 89 represents all other sensors of patient support apparatus 12 such as one or more sensors 64 used to sense whether a caster braking system of patient support apparatus 12 is in a braked or released position and/or sensors used to detect whether each of the siderail assemblies 78, 80 is raised or lowered, or other sensors as known in the art.

As discussed above, main controller 18 includes a processor 72 and a memory device 74 that stores instructions used by processor 72 as shown in FIGS. 3 and 4. Processor 72 may further consider information gathered from sensors 64, air system controller 62, and SCD assembly 14 to determine when to actuate, adjust, or cease the sequential compression. Illustratively, such sensors 64 are embodied as pressure sensors 64 although it may be embodied as other sensors known in the art used either alone or in combination with pressure sensors 64.

Further, memory device 74 may be pre-programmed to alert the caregiver upon exceeding a predetermined threshold so to avoid patient discomfort, pressure necrosis, and/or loss of capillary integrity leading to edema and increased compartmental pressures. To explain, memory device 74 may be configured to alert the caregiver of a pressure of SCD assembly 14 which exceeds a predetermined threshold pre-programmed therein.

Such a predetermined threshold of pressure may be based on the patient's vitals, medical history, desired outcome of pneumatic therapy (i.e.: sequential compression therapy via SCD assembly 14), as well as other data measurements by sensors 64. Therefore, it is desirable to identify the sequential compression threshold of each patient and avoid reaching such a threshold to avoid patient discomfort, pressure necrosis, and other associated complications.

Figure 6:
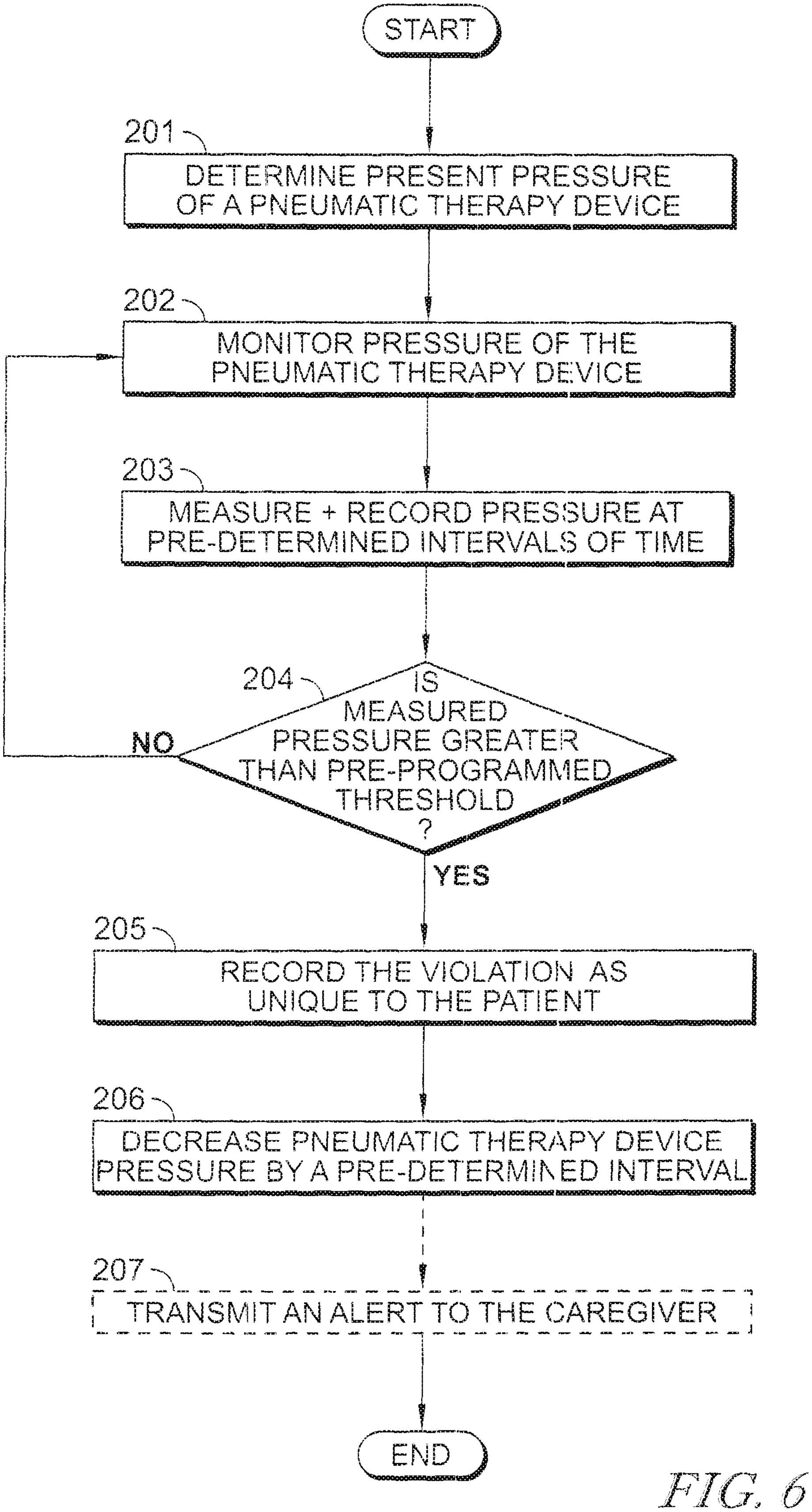
FIG. 6 is a flowchart showing an algorithm preprogrammed in the main controller and configuring the main controller to measure the pressure of the pneumatic therapy device, compare the measured pressure to a preprogrammed threshold, and determine/communicate any necessary pressure adjustment to the air source.

This may be accomplished via the method shown in FIG. 6. This method includes determining/preprogramming main controller 18 with the ideal pressure/therapy to be applied upon the patient via pneumatic therapy device 14. Step 201 includes determining the present pressure applied upon the patient by pneumatic therapy device 14 using sensors 64. Step 202 includes monitoring the pressure applied upon the patient by pneumatic therapy device 14 throughout pneumatic therapy. Main controller 18 is configured to identify and record the pressure of pneumatic therapy device 14 by measuring and recording the pressure of SCD assembly 14 at pre-determined time intervals (i.e.: every 30 minutes, every 1 hour, etc.), at step 203. The measured pressure of pneumatic therapy device 14 is then compared to the pre-programmed threshold to determine a threshold violation via the cooperation of sensors 64 and air system 20, at step 204. If no violation has occurred, sensors 64 and air system 20 return to step 202. If a violation has occurred, the violation is recorded as unique to the patient located on patient support apparatus 12, at step 205. In approaching the pre-programmed threshold of pressure, the patient is at an increased risk of pressure necrosis, edema, acute compartment syndrome, and/or peroneal nerve palsy. Therefore, the avoidance of maintaining increased pressure on a patient for extended periods of time is desirable. As such, when the pre-programmed threshold is exceeded, main controller 18 is configured to communicate with air system controller 62 to automatically adjust the pressure of pneumatic therapy device 14, at step 206. In some embodiments, step 207 includes alerting the caregiver of the violation. Optionally, only one of steps 206 or 207 may be completed. Illustratively, both pneumatic therapy device 14 pressure is adjusted and the caregiver is alerted such that steps 206 and 207 are completed by main controller 18. Main controller 18 is further configured to measure, record, and adjust the pressure of pneumatic therapy device 14 automatically at periodic intervals, as discussed above. These intervals may be programmed to run at intervals pre-programmed into main controller 18, randomly run by main controller 18, or some combination thereof.

Figure 5:
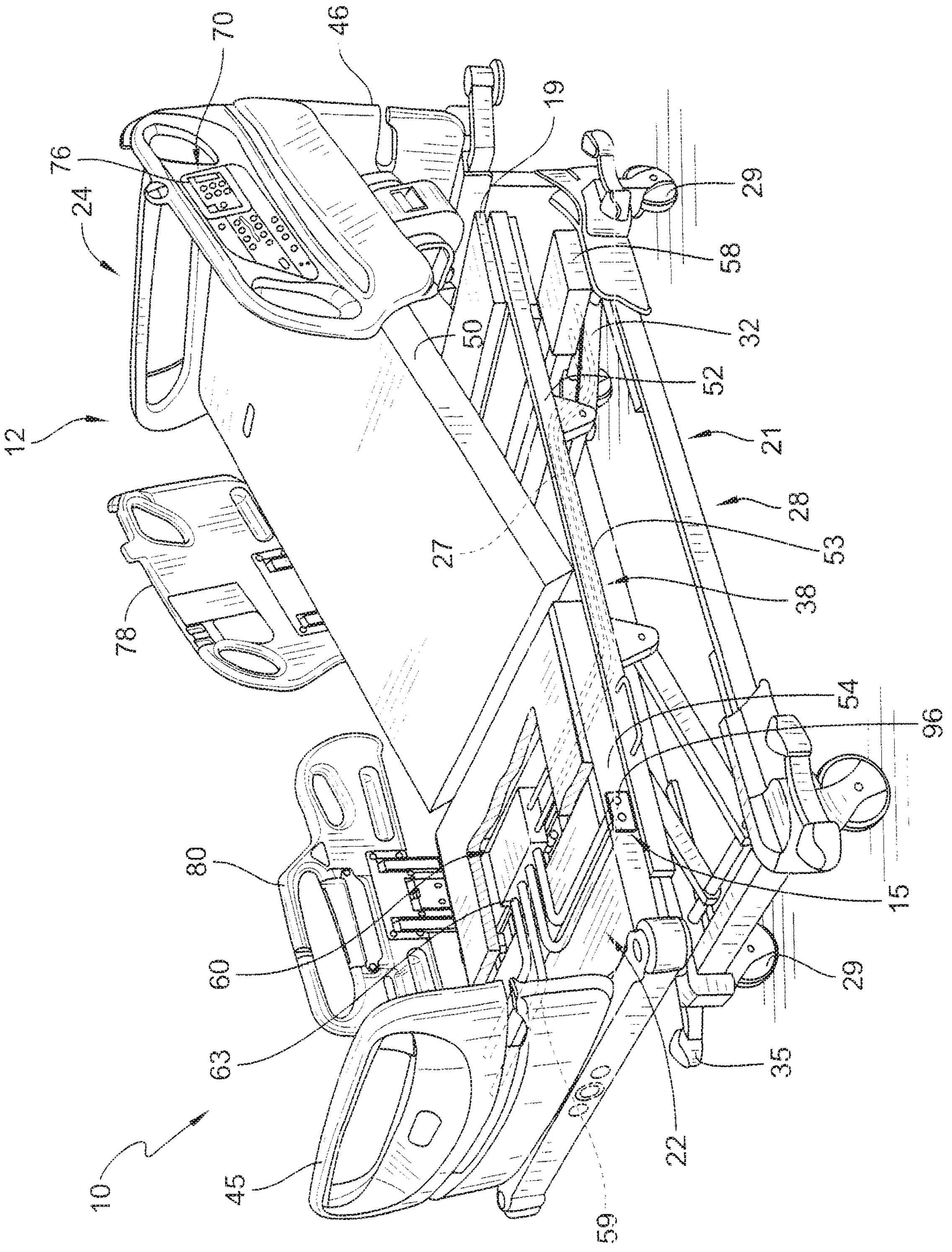
FIG. 5 is a perspective view of the patient support apparatus of FIG. 1 showing a manifold coupled with a plurality of hoses extending therefrom and terminating at a port formed in the upper frame assembly of the patient support apparatus.

As mentioned previously, the operation of SCD assembly 14 is controlled by main controller 18 in communication with air system 20. Referring now to FIGS. 1, 2, and 5, air source 58 is illustratively coupled to frame 21 underneath a head end 41 of upper frame assembly 30 and is configured to supply and direct a pressured air stream to SCD assembly 14. Air system 20 includes a source of pressurized air 58, a distribution manifold 60, and an air system controller 62. Source of pressurized air 58 is configured to generate and communicate a pressurized air stream to SCD assembly 14 through distribution manifold 60 coupled to frame 21 and a plurality of tubes 27 extending therebetween. A plurality of air hoses 59 are coupled to distribution manifold 60 and extend between distribution manifold and edge 31 of deck 38 terminating in a port 15. The plurality of tubes 27, distribution manifold 60, and plurality of air hoses 59 cooperate to guide the pressurized air stream from source of pressurized air 58 to SCD assembly 14. Distribution manifold 60 is formed to include a plurality of valves 63 and a plurality of pressure sensors 64 and is configured to adjust the pressure of the air from the source of air 58 before it enters pneumatic therapy device 14. Air system controller 62 is in communication with main controller 18, source of pressurized air 58, and distribution manifold 60 and is operable to detect connection of SCD assembly 14 to port 15, communicate detection of connection to main controller 18, and initiate operation of therapy system 10 in response to the communication. The detection of SCD assembly 14 may be accomplished by an at least one pressure/attachment sensor 64 configured to identify attachment of SCD assembly 14 to port 15 by monitoring changes in pressure readings that occur when connected.

The source of pressurized air 58 is in electrical communication with main controller 18 and air system controller 62 and coupled to distribution manifold 60 as shown in FIGS. 1, 2, and 5. Illustratively, source of pressurized air 58 is embodied as a compressor 58 of patient support apparatus 12 such that air system 20 shares compressor 58 with patient support apparatus 12 as well as with other therapy systems coupled thereto. In utilizing a single source of pressurized air 58 for functions of patient support apparatus 12 and air system 20, therapy system 10 reduces the clutter of a second, distinct source of pressurized air commonly associated with SCD assemblies 14 and configured to operate solely with SCD assembly 14 and/or other modular therapies. As such, in some contemplated embodiments, wherein mattress 22 is an air mattress that contains one or more air bladders or layers (not shown), air system 20 is configured to control inflation and deflation of the various air bladders or cells and/or layers of air mattress 22 as well as SCD assembly 14. Source of pressurized air 58 may be embodied as a compressor, pump, fan, a blower, or any other source configured to provide pressurized air known in the art.

Illustratively, source of pressurized air 58 is coupled to frame 21 at base 28 and is further coupled to the plurality of tubes 27 such that the pressurized air produced in source 58 may be guided into air hoses 59 as shown in FIGS. 2 and 5. In some embodiments, plurality of tubes 27 may include those already coupled to patient support apparatus 12 and extending between the source of pressurized air 58 and the manifold 60. In other embodiments, the plurality of tubes 27 extends from the air source 58, up lift system 32, along upper frame assembly 30, and terminates at distribution manifold 60. As shown in FIGS. 2 and 5, distribution manifold 60 is coupled to upper frame assembly 30 and positioned under seat section 42 of mattress 22. From here, air hoses 59 are routed to each of the pair of edges 31 of deck 38. Illustratively, at least two air hoses 59 are routed to each of the pair of edges 31, terminate at a port 15 formed in each of the edges 31. Illustratively, a port 15 is formed in the foot section 54 of each edge 31 of deck 38. Port 15 is configured to couple to SCD assembly 14 and, thereby, guide pressurized air into SCD assembly 14 during therapy. Illustratively, port 15 is formed to include a plurality of apertures/valves 16. Each aperture/valve 16 is configured to couple to a single SCD assembly/therapy device 14 such that each port 15 is configured to couple to multiple SCD assemblies/therapy devices 14.

As shown in FIG. 4, source of pressurized air 58 includes a pump 82 and a switching valve 84. Pump 82 is coupled to switching valve 84 and configured to draw ambient atmospheric air into air source 58 and exhaust air into the atmosphere. Switching valve 84 is exposed to the atmosphere and configured to either provide for or block the air into and out of air source 58. Pump 82 includes an inlet (not shown) and an outlet (not shown) coupled to switching valve 84 and is configured to cooperate with switching valve 84 to create a flow path for the air. Switching valve 84 includes a plurality of outlets (not shown) coupled to the inlet of pump 82 and a second inlet (not shown) coupled to the outlet of pump 82. At least one outlet of switching valve 84 is open to the atmosphere to provide the flow path for drawing air into air source 58 or exhausting air to the atmosphere depending on the position of switching valve 84.

Distribution manifold 60 is coupled to upper frame assembly 30 of patient support apparatus 12 and configured to direct the pressurized air stream away from source of pressurized air 58 and terminate at a second end 95 of at least one aperture 96 formed in frame 21, as shown in FIG. 2. Distribution manifold 60 includes a plurality of valves (not shown) to control air flow between pressurized air source 58 and SCD device assembly 14. Illustratively the valves are embodied as solenoid valves. In addition, distribution manifold 60 is operable to close the plurality of valves to maintain the pressure in SCD assembly 14. Distribution manifold 60 may also selectively control venting of the SCD assembly 14 to an exhaust (not shown). Illustratively, distribution manifold 60 guides pressurized air stream towards two apertures 96 formed in frame 21 as shown in FIGS. 1 and 2. Each aperture 96 is part of the port 15 and configured to couple to an at least one SCD assembly 14 and provide pressurized air stream to SCD assembly 14. Illustratively, each aperture 96 is configured to couple to an SCD assembly 14 such that each SCD assembly 14 is configured to operate independently of the other. In some embodiments, additional apertures 96 are formed in the edges of mattress 22 and configured to couple to additional SCD assemblies and/or other therapy devices (not shown). Distribution manifold 60 is in communication with air system controller 62 and configured to operate in response to controls from air system controller 62 and/or main controller 18.

As such, upon receiving an input from user interface 70, main controller 18 communicates the appropriate signal(s) to air system controller 62 to control air system 20. Therefore, when a function is requested by main controller 18, air system controller 62 is configured to energize the appropriate valve of distribution manifold 60 and set an appropriate pulse width modulation for source of pressurized air 58. Illustratively, ambient, environmental air enters air system 20 through distribution manifold 60 and to SCD assembly 14. Illustratively, pressurized air is guided into conduit 110 of SCD assembly 14 through port 15. Conduit 110 guides the pressurized air into therapy sleeve 108 via a pneumatic connector 115 formed in an outer surface 141 of sleeve 108. Illustratively, each sleeve 108 is formed to include a pressure tap (not shown) in communication with air system 20. The pressure taps are routed to distribution manifold 60 and coupled to a plurality of pressure sensors 64 through sense lines for feedback of pressure levels within SCD assembly 14. For example, if pressure in sleeve(s) 108 exceeds a threshold pre-programmed in main controller 18, pressure sensors 64 sense the sleeve(s)' 108 pressure, provide feedback to main controller 18, and the main controller 18 communicates with air system controller 62 to adjust the pressure of sleeve(s) 108 accordingly. The aforementioned system is closed-loop and feedback dependent.

Illustratively, sensors of sensor block 89, such as, for example, Hall-effect sensors, RFID sensors, near field communication (NFC) sensors, pressure sensors, or the like, are configured to sense tokens (e.g., magnets, RFID tags, NFC tags, etc.). Illustratively, the type/style of sleeve 108 is sensed by sensors 89 and communicated to main controller 18 which, in turn, communicates the sleeve 108 type information to the circuitry for ultimate display on GUI 76 in connection with the compression device control screens. Illustratively, pressure sensors 64 are configured to identify the presence and absence of conduit 110 and, in response, automatically begin, halt, or adjust therapy, respectively, which is discussed in further detail below.

To control pressure, air system controller 62 is configured to regulate the speed of source of pressurized air 58 in correlation to pressure. For example, if a pre-programmed threshold requires a particular discharge from source of pressurized air 58 for function of SCD assembly 14, then main controller 18 is configured to communicate to air system controller 62 so that the appropriate pulse width modulation settings are fixed so to establish the correct pressure and flow output from source of pressurized air 58.

Air system controller 62 is in electrical communication with aforementioned plurality of pressure sensors 64 and is configured to control the operation of air system 20, including the operation of distribution manifold 60 and air source 58, to control the pressure within SCD assembly 14. As such, main controller 18 is configured to monitor the pressure in SCD assembly 14 and determine a violation of the pre-programmed pressure threshold in SCD assembly 14 based on signals received from pressure sensors 64. Main controller 18 receives a plurality of signals indicative of the pressure of SCD assembly 14 from respective pressure sensors 64, as discussed above. Main controller 18 is further configured to interpret signals received from pressure sensors 64 and compare them to the predetermined threshold. Upon exceeding this threshold, main controller 18 is configured to convey a signal to air system controller 62 instructing a decrease in pressure and flow output from source of pressurized air 58. Main controller 18 is further configured to produce an alarm 85 to notify the caregiver of the event violating the threshold and/or other information associated with SCD assembly 14 and/or the patient. Such alarms 85 may be audio, visual, tactile, and/or any other method of notification known in the art. In some embodiments, air system controller 62 may be in communication with sensors 64 and configured to interpret the signals from pressure sensors 64 to main controller 18, determine if a pre-programmed threshold has been violated, communicate such a violation to main controller 18 and decrease the flow output of source of pressurized air 58. In such an embodiment, main controller 18 is illustratively programmed to produce and convey and alarm to the caregiver of the violation of the pre-programmed threshold upon evaluation of the signals received from air system controller 62.

Air system controller 62 includes a processor 100 and a memory device 102 which stores instructions used by processor 100 as shown in FIG. 3. In some embodiments, processor 100 may consider information gathered from pressure sensors 64 and/or SCD assembly 14 to determine when to provide pressure to SCD assembly 14 such that sequential compression may occur. As discussed above, in some embodiments, main controller 18 is in communication with air system controller 62 such that upon reaching a predetermined pressure threshold, a signal is sent first from pressure sensors 64 to main controller 18 and then communicated to air system controller 62. In some embodiments, air system controller 62 itself is pre-programmed to identify pressure exceeding a preprogrammed threshold and is further configured to convey such information to main controller 18. Illustratively, air system controller 62 and main controller 18 are configured to cooperate to alert the caregiver when the pressure of SCD assembly 14 exceeds the pre-programmed threshold.

As discussed above, SCD assembly 14 is configured to provide sequential compression therapy to a patient positioned on patient support apparatus 12 as shown in FIG. 1. SCD assembly 14 is removeably coupled to distribution manifold 60 and is configured to contain the pressurized air stream such that the pressure thereof may be applied to the patient via SCD assembly 14. SCD assembly 14 includes at least one compression sleeve 108 and at least one conduit 110 having a first end 112 removeably coupled to compression sleeve 108 and a second end 113 removeably coupled to port 15. In the illustrative embodiment, sleeve 108 is formed to fit a patient's lower leg. In other embodiments, the sleeve 108 may be formed to fit a patient's foot, calf, thigh, or some combination thereof. Conduit 110 is configured to extend between sleeve 108 and distribution manifold 60 such that the pressurized air stream formed by source of pressurized air 58 is directed from source 58 through distribution manifold 60 and further through conduit 110 until reaching sleeve 108. As such, when sleeve 108 is positioned on a lower extremity of the patient, SCD assembly 14 is configured to provide each lower extremity of the patient with therapy independent of the other. Further, main controller 18 may be configured to selectively inflate a first compression sleeve 108 independent of a second compression sleeve 108 such that the second compression sleeve 108 remains uninflated throughout the duration of therapy. Illustratively, each sleeve 108 has a respective conduit 110 coupled thereto and is independent of the other. In some embodiments, a single conduit 110 is shared between multiple sleeves 108.

As such, sleeves 108 are configured to adjust the amount of compression applied to the patient in response to instructions from main controller 18 and/or air system controller 62. Specifically, sleeves 108 are configured to respond to user inputs including, for example, the target pressure to which each sleeve 108 is to be inflated by air system 20 and/or the desired zone(s) (i.e.: foot zone, calf zone, thigh zone, or some combination thereof) of each sleeve 108 to be inflated by air system 20 if sleeve 108 has multiple zones. The selectable therapy settings further include, for example, the frequency of compression, the duty cycle of the compression cycles, the number of cycles, the time period over which the compression therapy is to take place, or some combination thereof. In some embodiments, the selectable therapy settings include selection of pressure versus time curves (e.g., step up and/or step down curves, ramp up and/or ramp down curves, saw tooth curves, and the like) as well as the parameters for the various types of curves (e.g., pressure setting at each step, duration of each step, duration of ramp up, duration of ramp down, and the like).

Looking to FIGS. 1 and 2, and as discussed above, compression sleeves 108 are formed to include pneumatic connector 115. Connector 115 is coupled to an outer surface 141 of sleeve 108 and configured to couple conduit 110 thereto. Illustratively, connector 115 extends away from sleeve 108 a distance to reduce the likelihood of long-term contact between conduit 110 and the patient which otherwise results in patient discomfort. In such embodiments, connector 115 may be formed as a pigtail pneumatic connector 115. A pigtail pneumatic connector 115 is formed to couple sleeve 108 and conduit 110 and is extends the length of connector 115 such that conduits 110 are spaced apart from the patient at a greater distance than a non-pigtail pneumatic connector 115. To further avoid patient discomfort resulting from prolonged patient contact with conduits 110, in some embodiments, pneumatic connector 115 includes an outer shell (not shown) formed from a pliable material. In other embodiments, pneumatic connector 115 includes an inner shell (not shown) formed from a rigid material and an outer cover (not shown) encompassing the inner shell and formed from a pliable material.

As shown in FIGS. 1 and 2, conduit(s) 110 are configured to removeably couple to a port 15 and may be embodied as tubes and/or hoses. As such, conduit(s) 110 are configured to extend between port 15 and sleeve(s) 108 and are formed to receive pressurized air from air system 20. Illustratively, at least one port 15 is formed in each lateral side 17 of patient support apparatus 12. Further, multiple ports 15 may extend outwardly from upper frame assembly 30. In coupling conduit 110 and distribution manifold 60, port 15 configures conduit 110 to guide stream of pressurized air towards sleeve 108. Illustratively, each of a pair of compression sleeves 108 is configured to couple to a respective first end 112 of each of a pair of conduits 110 such that each compression sleeve 108 is configured to provide sequential compression to a lower extremity of the patient. In some embodiments, a multi-port connector (not shown) is provided at second end 113 of conduits 110 to permit simultaneous attachment of multiple conduits 110 to associated coupler(s) 116 positioned at opposite lateral sides 17 of patient support apparatus 12.

Figure 9:
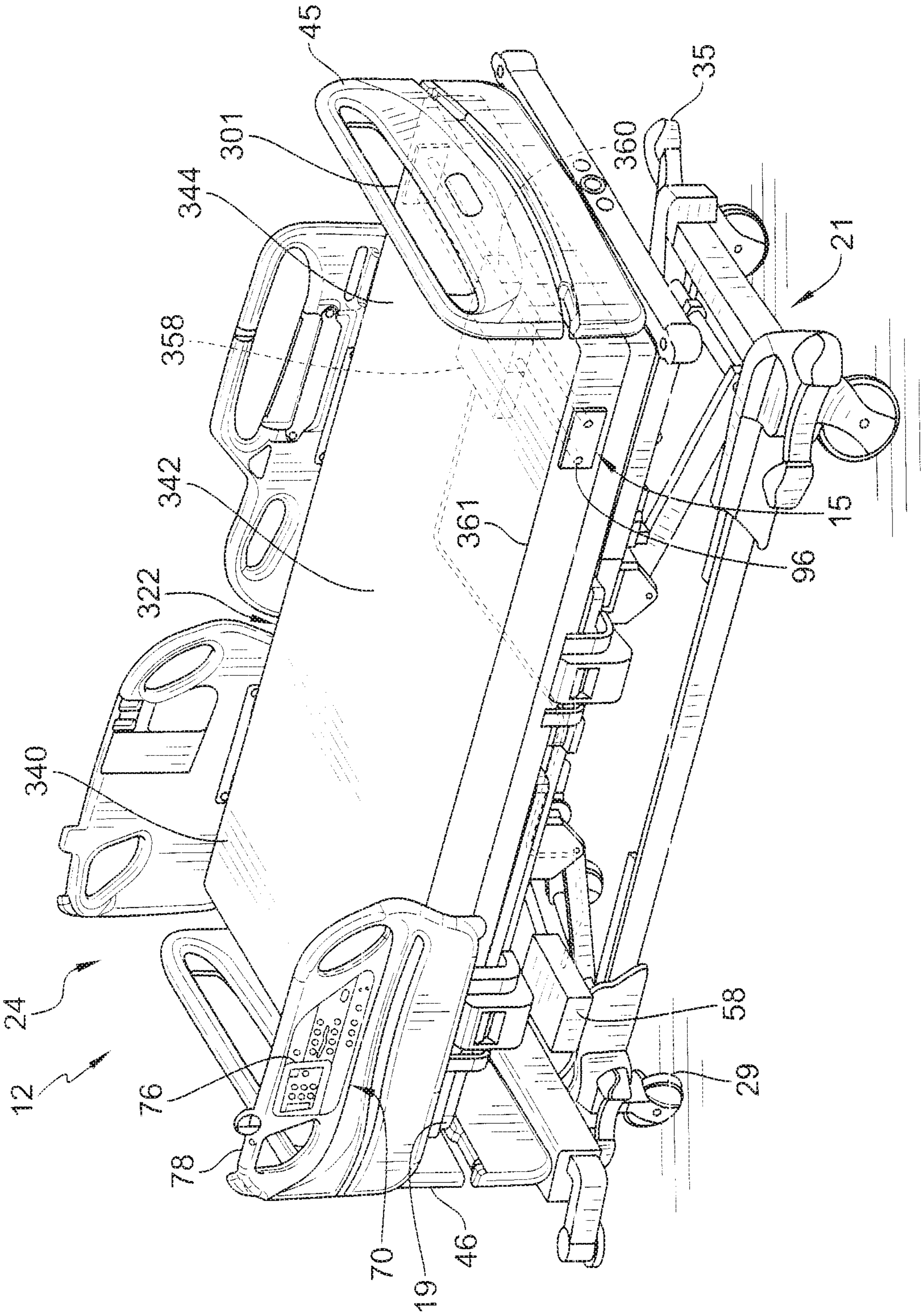
FIG. 9 is a perspective view of another embodiment of a bed similar to the embodiment shown in FIG. 1, FIG. 9 showing a distribution manifold located in the foot section of the mattress and the ports formed in the foot section of the mattress.

As shown in FIG. 9, port 15 is formed in mattress 22 and is accessible by a caregiver when the patient is positioned on the mattress 22 and configured to couple to multiple SCD assemblies 14. Illustratively, a plurality of SCD assemblies 14 may be removeably coupled to port 15 formed in either edge 31 of deck 38. Additionally, and as discussed above, upon identifying the presence of conduit 110 removeably coupled to port 15, main controller 18 is configured to initiate sequential compression therapy upon identifying the removal of conduit 110 from port 15.

A caregiver may also initiate/terminate therapy by using user interface 70 and inputting the desired action. As such, a particular zone/combination of zone and sleeves 108 may be selected by the caregiver using user interface 70 via user inputs or buttons 13. For example, buttons 13 for selection by a user of left and/or right foot sleeves, left and/or right calf sleeves, left and/or right thigh sleeves, or left and/or right combination sleeves such as those described above appear on display screen 76, in some embodiments. It should be appreciated that the compression sleeve 108 on a patient's left leg may be of a different type than that on the patient's right leg. Alternatively or additionally, main controller 18 is operable to determine which type of sleeve 108 is connected to each port 15 based on the time it takes to inflate the particular sleeve 108 to a target pressure as measured by pressure sensors 64. After main controller 18 makes the sleeve type determination for the one or more sleeves 108 coupled to coupler(s) 116, such information is displayed on GUI 76. This may be accomplished via the algorithm shown in FIG. 7.

Figure 7:
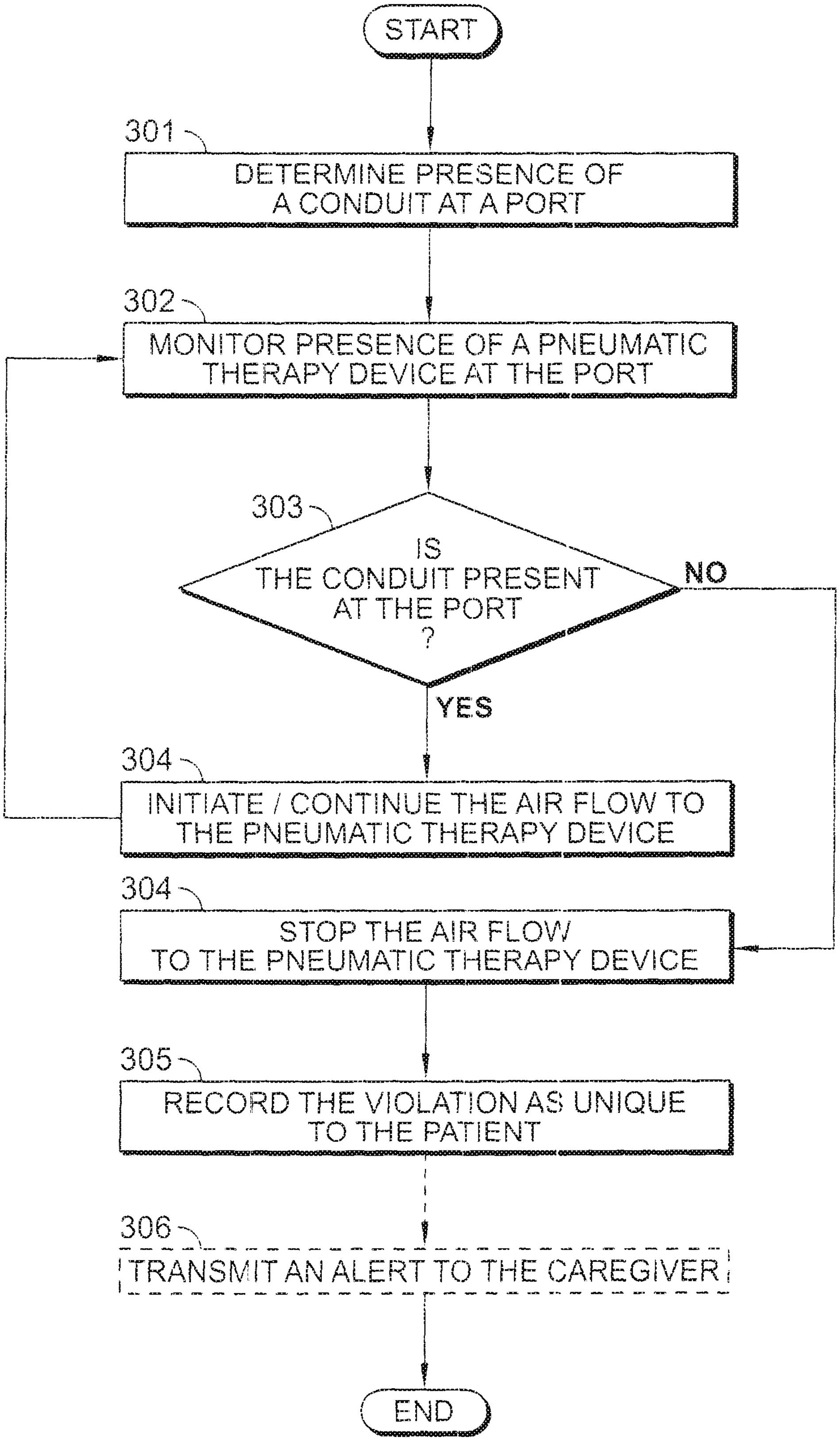
FIG. 7 is a flowchart showing an algorithm preprogrammed in the main controller and configuring the main controller to determine the presence of the conduit at the port formed in the bed of FIG. 1 or other embodiments and initiate/continue or cease the air flow to the pneumatic therapy device in response to the presence determination.

The algorithm as shown in FIG. 7 includes determining/pre-programming main controller 18 with the desired therapy and pressure to be applied to the patient upon identification of the presence of conduit 110 by sensors 64. The initial presence of conduit 110 at port 15 is determined at step 301 by sensors 64 and main controller 18. Step 302 includes monitoring sensors 64 for presence of conduit 110. Sensors 64 are configured to determine the presence of conduit 110 at port 15 and convey a signal to main controller 18 and/or air system, controller 62. In some embodiments, when the signal from sensors 64 is conveyed to air system controller 62, air system controller 62 is configured to communicate the signal to main controller 18. Illustratively, main controller 18 is configured to interpret the signal from sensors 64 and determine the presence or absence of conduit 110 at port 15, at step 303. At step 304, if the signal indicates the presence of conduit 110, then main controller 18 communicates to air system controller 62 to initiate the pre-programmed therapy and pressure assigned in step 301. At step 304, if conduit 110 is not present at port 15 then air flow to SCD assembly 14 is stopped by instructions from main controller 18 to air system controller 62. At step 305, the signals from sensors 64 and initiation of therapy by main controller 18 and air system controller 62 are recorded. In some embodiments, step 306 is further included and comprises alerting the caregiver of the decoupling of conduit 110 from port 15. Optionally, only one of steps 305 or 306 may be completed. Illustratively, upon main controller 18 determining the removal of conduit 110 from port 15, the pressurized air flow to SCD assembly 14 is stopped by main controller 18 in communication with air system controller 62 and the caregiver is alerted of the violation, thereby completing steps 305 and 306.

Main controller 18 is, therefore, illustratively configured to automatically communicate to air system controller 62 to stop therapy in response to a signal from sensors 64 conveying a disconnection of conduits 110 and ports 15. Similar to the algorithm described above and shown in FIG. 7, sensors 64 are in communication with main controller 18 and configured to convey data concerning conduit 110. A distinction between the algorithms concerns the identification of the removal of conduit 110 from port 15 rather than the presence of conduit 110. As such, both measurements may be determined in a single step due to the integral relationship of the presence/absence of conduit 110 at port 15. In some embodiments, sensors 64 are configured to determine the removal of conduit 110 from port 15 and signal to air system controller 62 the removal of conduit 110, at step 303. Air system controller 62 then stops the creation/conveyance of pressurized air flow to SCD assembly 14, at step 304, thereby removing main controller 18 from the method in this additional embodiment.

In some embodiments, upon main controller 18 receiving the data from sensors 64 identifying the presence of conduit 110 at port 15, main controller communicates with scale system 23 which detects the presence of SCD assembly 14 and zeros the scale to zero pounds. This avoids discrepancies in patient weight due to the weight of SCD assembly 14 and is done automatically such that the caregiver does not have to remember to zero the patient support apparatus 12 before measuring the weight of the patient positioned on patient support apparatus 12.

In some embodiments, the removal of pneumatic therapy device 14 and the associated data is communicated to the main controller 18. Such associated data may include, but is not limited to, the location of pneumatic therapy source 14. This data may then be conveyed between main controller 18 to a wall unit (not shown) and further communicated between the wall unit and a nurse station computer 176.

As discussed above, when SCD assembly 14 is coupled to air system 20, air system 20 senses the presence of SCD assembly 14 and begins the transmission of power and/or pressurized air between SCD assembly 14 and air system 20. Illustratively, such transmission of pressurized air is conveyed through a wired connection to SCD assembly 14. Whereas the transmission of power may be completed wirelessly, illustratively. In other embodiments, the transmission of power may be conveyed through a wired connection. In some embodiments, air system 20 continuously generates the pressurized air stream upon coupling to SCD assembly 14, thereby causing SCD assembly 14 to maintain a desired level of pressure within SCD assembly 14. In other embodiments, air system 20 is pre-programmed to generate pressurized air in cycles, waves, and/or any other desired patterns. In still other embodiments, main controller 18 and air system 20 are in communication such that air system 20 is configured to move between a plurality of pre-programmed patterns in response to user input or automatically in response to sensed pressure values of SCD assembly 14 exceeding a predetermined threshold. Main controller 18, sensors 64, and air system 20 are in communication and further configured to identify the removal of the SCD assembly 14 and, illustratively, stop production of the pressurized air stream within the air system 20.

Therefore, upon identification of SCD assembly 14 coupling to air system 20, air system 20 communicates such coupling to main controller 18. Main controller 18 is configured to communicate with user interface 70 such that user interface 70 is updated to control operation of SCD assembly 14 by allowing access to air system 20 via user interface 70. Such access allows for a caregiver to input/receive patient data at a centralized location on patient support apparatus 12. Illustratively, user interface 70 is configured to alert the caregiver upon disconnection of SCD assembly 14 and air system 20 and/or other interruptions to the therapy therein provided.

In further embodiments, conduit 110 is formed as a pneumatic conduit 110 and is made of an elastic, non-porous material configured to expand in length when pressurized with air. Such elastic, non-porous material is configured to move between an extended length (not shown) and a storage length (not shown) in response to the presence of pressurized air therein. Storage length has a distance measuring less than a distance of extended length, and, as such, storage length has a surface area measuring less than a surface area of extended length. At rest, pneumatic conduit 110 has the storage length. Upon actuation of source of pressurized air 58, pneumatic conduit 110 reacts to the presence of pressurized air by increasing the length and surface area of pneumatic conduit 110. As such, so long as the pressurized air is directed into pneumatic conduit 110, pneumatic conduit 110 will maintain the extended length. Therefore, a production and direction of the majority of the pressurized air into conduit 110 is to be ceased before conduit 110 returns to storage length. This permits conduit 110 to be stored in a variety of manners due to the decreased length and surface area of conduit 110.

In other embodiments in which conduit 110 is formed as a pneumatic conduit, the pneumatic conduit is configured to include a break away coupler (not shown). The break-away coupler may be positioned between sleeve 108 and conduit 110 and/or between a first conduit section extending between sleeve 108 and break away coupler and a second conduit section extending between break-away coupler and second end of the second conduit. When present, the break-away coupler is configured to disconnect from conduit 110 when longitudinal forces in line with conduit 110 exceed a pre-determined breaking force of the break-away coupler. The force needed to decouple the break-away coupler and conduit 110 is substantially greater than the longitudinal force created by the pressurized air within conduit 110 during operation of SCD assembly 14 and/or other therapies. As such, actuation of SCD assembly 14 does not cause the break-away coupler to break away from conduit 110 unless such force exceeds the breaking force of the break-away coupler. Further, the breaking force is substantially less than the force exerted upon conduit 110 by a leg of the patient when conduit 110 creates a fall risk. The break-away coupler, therefore, is configured to break away from conduit 110 in response to the patient tripping over conduit 110, thereby resulting in a cessation of therapy until the break-away coupler is reattached to conduit 110. As such, upon main controller 18 ceasing production of pressurized air and the caregiver removal of SCD assembly 14 and SCD assembly 14 is decoupled from mattress 22.

Figure 8:
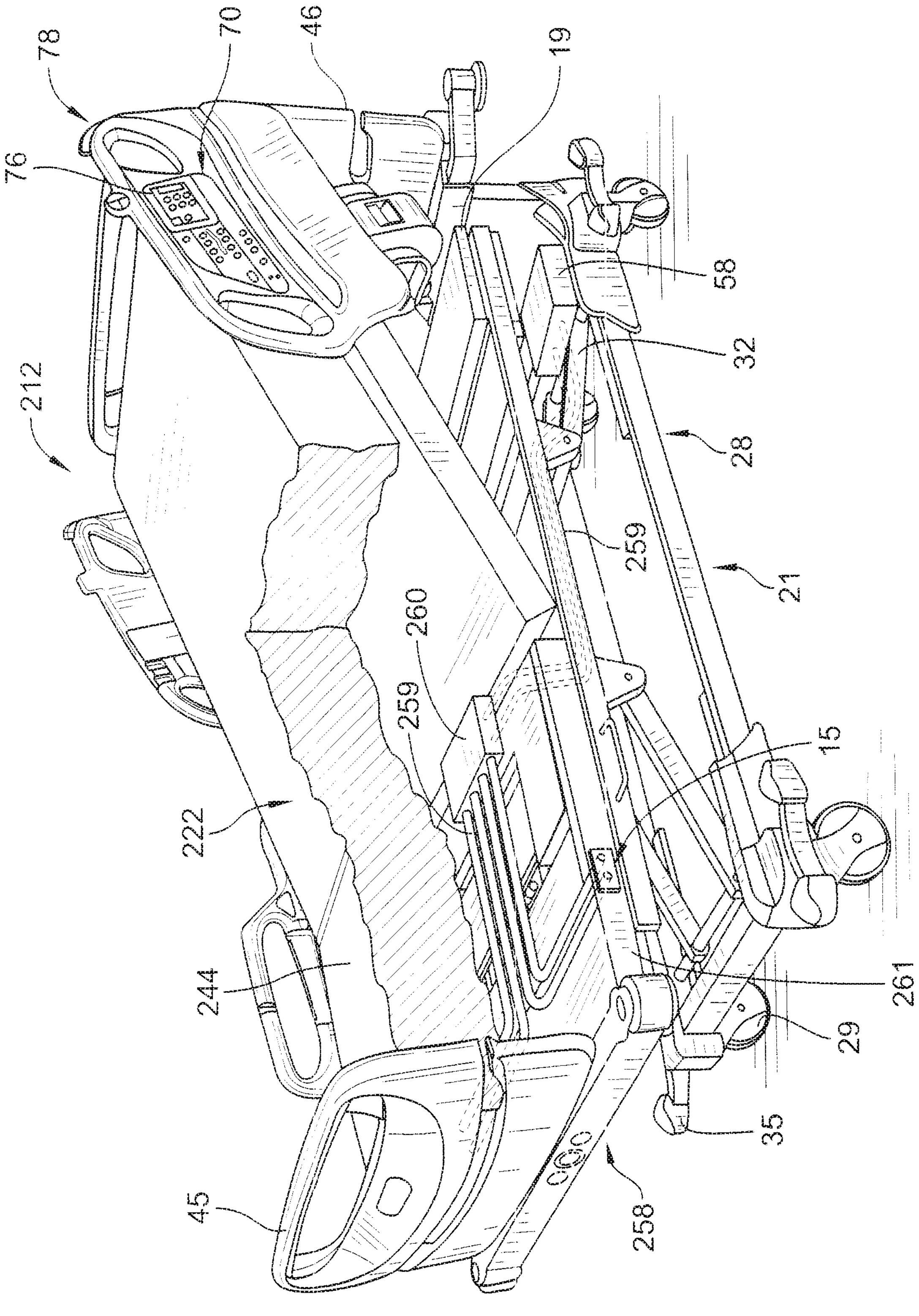
FIG. 8 is a perspective view of an another embodiment of a bed similar to the embodiment shown in FIG. 1, FIG. 8 showing a distribution manifold located on the foot section of the bed and ports formed in the foot section of the upper frame assembly of the patient support apparatus.

In other embodiments, source of pressurized air 58 is positioned on frame 21 at base 28 and coupled to a plurality of air hoses 259 as shown in FIG. 8. Air source 58 is in communication with plurality of air hoses 259 such that the pressurized air produced in air source 58 may be guided into air hoses 259. Air hoses 259 extend from air source 58, up lift system 32, and into mattress 222 at seat section 244. The portion of the air hoses 259 located in the seat section 244 extend towards distribution manifold 260 positioned in seat section 244 of mattress 222. Air hoses 259 couple to and extend through distribution manifold 260 down mattress 222 to foot section 244. Illustratively, air hoses 259 are formed as four air hoses 259 split into sets of two such that one pair of air hoses 259 extends towards either edge 261 of foot section 244 of mattress 222 while the other pair of air hoses 259 extends towards the opposite edge 261 of foot section 244. Similar to the embodiment of FIG. 1, each air hose 259 terminates at port 15 formed in each of the edges 261 of foot section 244 of bed 212. As shown, port 15 is formed in bed deck 258 of bed 212, and each port 15 is configured to couple to SCD assembly 14 and, thereby, guide pressurized air into SCD assembly 14 during therapy. Illustratively, port 15 may be used independent of one another and/or simultaneously. Further, if both valves 101 of a single port 15 are used simultaneously, main controller 18 is configured to identify this and instruct source of pressurized air 58 to compensate so to maintain pressure in SCD assembly 14. This relieves the caregiver of having to discover the error in order for the patient positioned in patient support apparatus 12 to receive the desired therapy.

In another embodiment, air hoses 359 enter mattress 322 at seat section 342 as shown in FIG. 9. The portion of the air hoses 359 located in the mattress 322 extend away from seat section 342 towards a microclimate management (MCM) blower 358 located in a foot end 344 of mattress 322. Distribution manifold 360 is positioned within foot section 344 of mattress 322 and in communication with MCM blower 358 and a plurality of air hoses 359. Plurality of air hoses 359 are coupled thereto such that the pressurized air produced in MCM blower 358 may be guided into air hoses 359 by distribution manifold 360, as shown in FIG. 9.

Illustratively, distribution manifold 360 is formed to reduce air-loss from blower 358 to air hoses 359. Air hoses 359 extend from seat section 342 of mattress 322 towards distribution manifold 360, through distribution manifold 360 and foot section 344 of mattress 322 towards edges 361 of mattress 322. Illustratively, and similar to the embodiment shown in FIGS. 1 and 10, air hoses 359 are formed as four air hoses 359 split into sets of two such that one pair of air hoses 359 extends towards either edge 361 of mattress 322 while the other pair of air hoses 359 extends towards the opposite edge 361. Similar to the embodiment of FIGS. 1 and 10, each air hose 349 terminates at port 15 formed in each of the edges 361. Each port 15 is configured to couple to SCD assembly 14 and, thereby, guide pressurized air into SCD assembly 14 during therapy. Similar to FIGS. 1 and 9, illustratively, ports 15 may be used independent of one another and/or simultaneously.

Further, the integration of power lines (not shown) and air hoses 59, 259, 359 avoid creation of a tripping hazard while allowing for coupling of external SCD assemblies 14 thereto. Further, such embodiments may be used while bed is between a reclined position and a seated position.

In some embodiments, source of pressurized air 58 is located within frame 21. Further, in any of the aforementioned embodiments, source of pressurized air 58 may be positioned within frame 21. The coupling of source of air 58 and SCD assembly 14 may, therefore, be accomplished in any of the manners described herein. In still other embodiments, two sources of pressurized air 58 may be positioned on patient support apparatus 12. The first source of air 58 may be coupled to the frame 21 as discussed herein and the second may be located within frame 21 of patient support apparatus 12. Further, one, both, or neither may be used to supply air to the SCD assembly 14.

Figure 10:
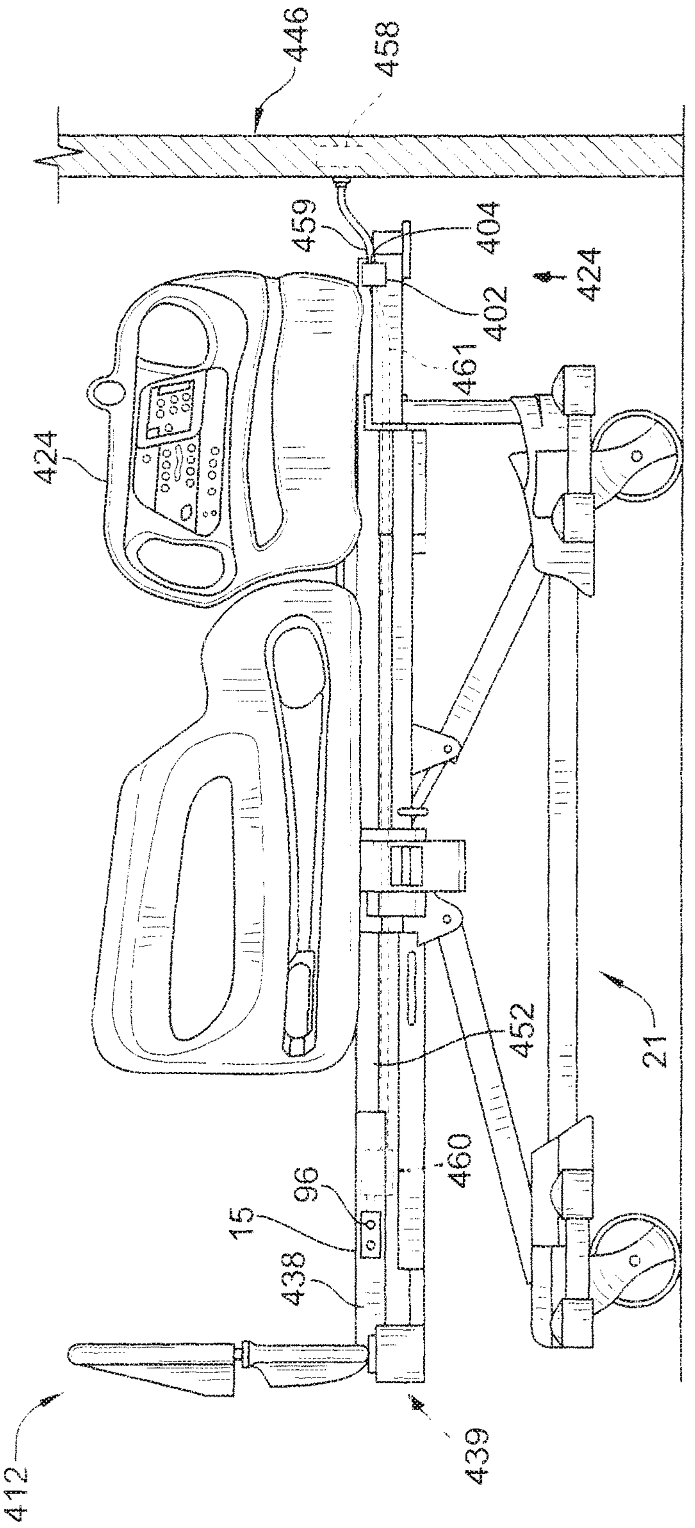
FIG. 10 is a left elevation view of another embodiment of a bed similar to the embodiment shown in FIG. 1, FIG. 10 showing an air source located in the headwall and in communication with the distribution manifold located in the head section of the upper frame assembly of the patient support apparatus and the ports formed in the foot section of the upper frame assembly of the patient support apparatus.
Figure 11:
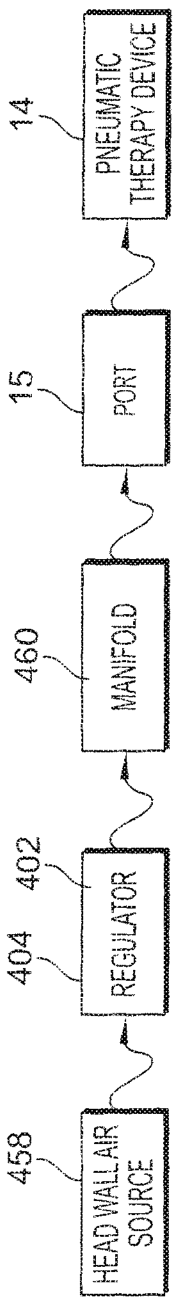
FIG. 11 is a block diagram showing the flow of pressurized air between the air source located in the headwall and the pneumatic therapy device and past a vent configured to decrease the amount of pressurized air entering the pneumatic therapy device.

In yet another embodiment, source of pressurized air 458 is coupled to and/or formed in headwall 446 as shown in FIGS. 10 and 11. SCD assembly 14 is configured to utilize source of pressurized air 458 already present in headwall 446 to power SCD assembly 14 such that an additional independent source of pressurized air is not needed. Although it will be appreciated by those skilled in the art that an independent source of pressurized air may be used in addition to source of pressurized air 458 located in headwall 446 and/or embodied as MCM blower 358, as in FIGS. 10 and 9, respectively. Illustratively, source of pressurized air 458 is configured to produce pressurized air for use in SCD assembly 14 and is coupled to a plurality of air hoses 459 extending away from source 458. Air hoses 459 extend from headwall 446 towards an air regulator 402 coupled to head end 424 of bed 412 and configured to decrease the pressure to an appropriate/desired level such that it may be used to power SCD assembly 14. Air hoses 459 couple to air regulator 402 at a first end 404 and are formed to guide the pressurized air from air source 458 to air regulator 402. A second plurality of air hoses 461 couple to a second end 406 of air regulator 402 and are shaped to guide the adjusted pressurized air towards distribution manifold 460 coupled to frame 21 at the seat section 452 of patient support deck 438.

Second plurality of air hoses 461 couples to and extends through distribution manifold 460 as shown in FIG. 10. Each of the second of air hoses 461 extends down to foot end 439 of bed 412 and terminates at least one port 15 formed bed deck 438. Bed deck 438 may be formed to include a plurality of ports 15. Each port 15 is formed to define a plurality of apertures 96 spaced apart from each other. Each aperture 96 is configured to couple to an at least one SCD assembly 14 and provide adjusted pressurized air stream to SCD assembly 14. Illustratively, each port 15 is configured to couple to two SCD assemblies 14. Similar to FIGS. 8 and 9, illustratively, ports 15 may be used independent of one another and/or simultaneously.

As discussed in detail above regrading FIG. 1, the embodiments of therapy systems 310, 410 as shown in FIGS. 9 and 10 are configured to utilize the user interface 76 of patient support apparatus 12 such that external SCD assemblies 14 may be controlled by the existing GUI 76. Further, the powering and communication abilities of SCD assemblies 14 are provided via existing power lines (not shown) and communication lines (not shown) of patient support apparatus 12 such that SCD assembly 14 and patient support apparatus 12 may be controlled simultaneously using existing GUI 76 of patient support apparatus 12.

Figure 12:
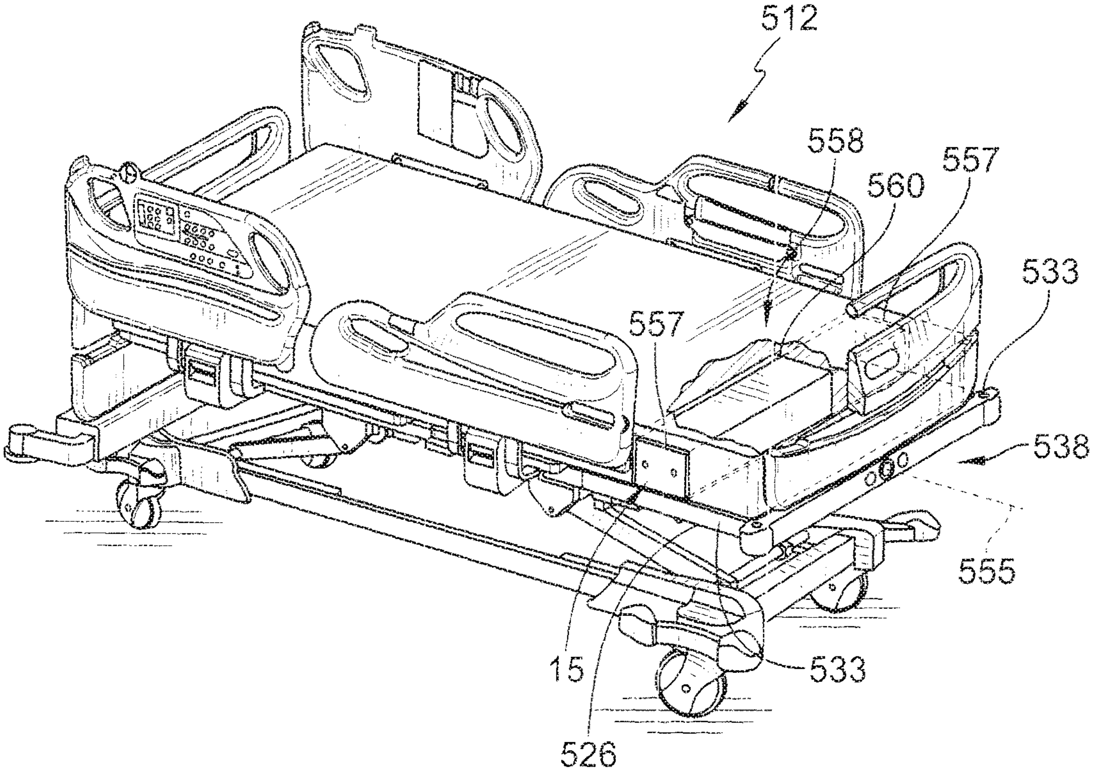
FIG. 12 is a perspective view of another embodiment of a bed similar to the embodiment shown in FIG. 1, FIG. 12 showing an air source housing located between the frame and the foot section of the mattress, the housing of the air source sized such that the sidewalls of the housing extend through the mattress.
Figure 13:
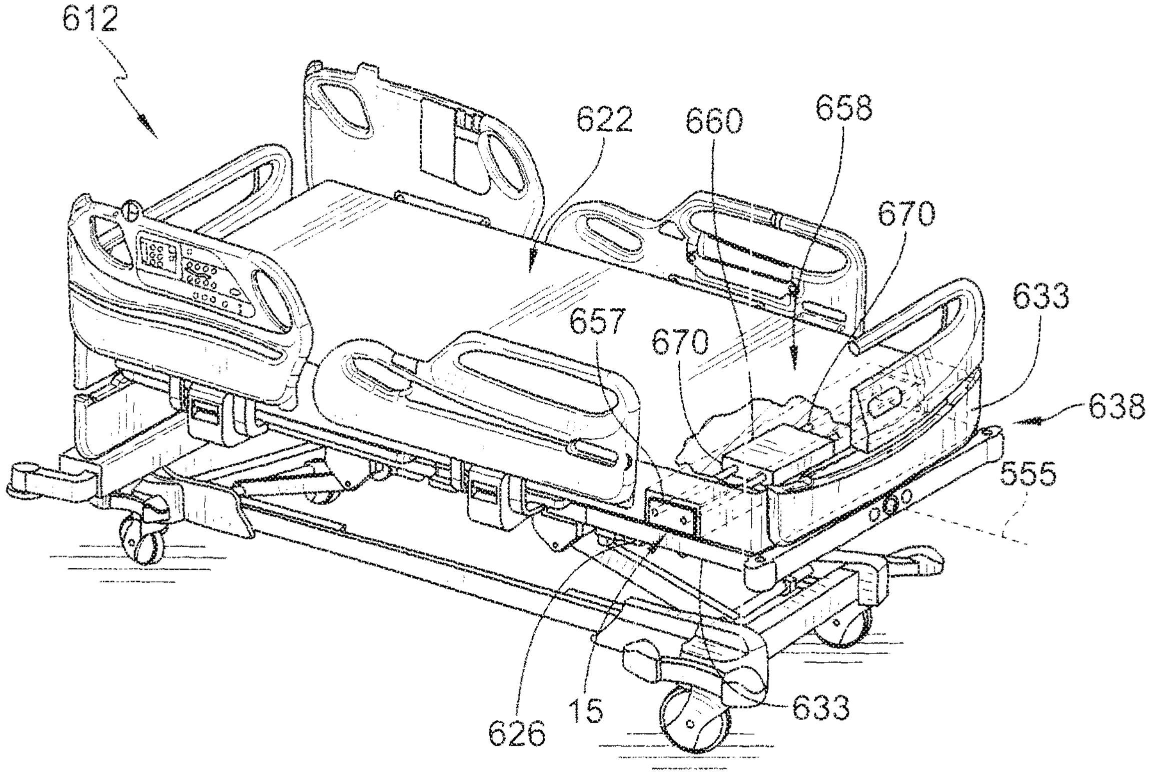
FIG. 13 is a perspective view of another embodiment of a bed similar to the embodiment shown in FIG. 1, FIG. 13 showing the air source housing located in a recess formed in the foot section of the mattress.

In further embodiments, source of pressurized air 558 is embodied as a pump assembly 558 independent of bed 512 and configured to couple thereto, as shown in FIGS. 12 and 13. Illustratively, pump assembly 558 is mounted on bed deck 538 at foot end 526 of bed 512 and centered on central axis 555 of bed 512. The pump assembly 558 includes a pump housing 560 and a pump (not shown) positioned therein. Pump housing 560 may be shaped to extend between central axis 555 and sides 533 of bed deck 538 such that a pair of lateral sides 557 forming pump housing 560 are accessible by a caregiver while the patient is positioned on bed 512 as shown in FIG. 12. Lateral sides 557 of pump housing 560 are formed to include at least one port 15 configured to couple to SCD assembly 14. Further, ports 15 may be configured to couple to a second plurality of hoses (not shown). The second plurality of hoses extends away from a connector (not shown) configured to couple to port 15 and terminates at a coupler (not shown). Each coupler is configured to couple to an at least one SCD assembly 14 and provide adjusted pressurized air stream to SCD assembly 14. Therefore, second plurality of hoses are sized to provide additional distance between pump housing 560 and SCD assembly 14.

In other embodiments, the pump housing 660 is not sized to extend between central axis 555 and sides 633 of bed deck 638 and is positioned between bed deck 638 and mattress 622 at food end 626 of bed 612, as shown in FIG. 13. Pump housing 660 is further coupled to a plurality of air hoses 670 at a pair of lateral sides 657 forming the pump housing 660. Plurality of hoses 670 extend away from pump hosing 660 towards sides 633 of bed deck 638 and terminate at least one port 15. Port 15 is configured to couple to a second plurality of hoses (not shown) which extend between port 618 and terminate at coupler (not shown), thereby providing additional distance between pump housing 660 and SCD assembly 14. The couplers are configured to couple to an at least one SCD assembly 14 and provide adjusted pressurized air stream to SCD assembly 14. Illustratively, the couplers may be used independent of one another and/or simultaneously. In still other embodiments, mattress 622 is formed to include a recess in a bottom surface of mattress 677 to accommodate pump housing 560, 660 as shown in FIG. 13.

In other embodiments, the pump assembly 558 may be coupled to a bottom surface of one of the upper frame assemblies 533, 30 at foot end of the embodiment of the bed. In such an embodiment, brackets may be coupled to the upper frame assembly and configured to provide clearance between foot end of bed and hoses.

In the embodiments as shown in FIGS. 12 and 13, the second plurality of hoses are configured to couple to port 15 via a connector (not shown). The connectors are spaced apart from and coupled to the end of the second plurality of hoses. The connectors are configured to removeably couple the second plurality of hoses to port 15 and guide pressurized air produced by pump 562 towards SCD assembly 14 removeably coupled to port 15. In some embodiments, the connectors may be formed to selectively couple to one of the ports 15 depending from which lateral side 557, 657 of pump housing 560, 660 the respective first plurality of hoses (not shown), 670 extends. For example, the first plurality of hoses (not shown), 670 coupled to a first lateral side 557, 657 are formed to terminate at a port 15 formed to receive a connector shaped as a male connection. Further, the first plurality of hoses (not shown) 670 coupled to a second lateral side 559, 659 are formed to terminate at port 15 formed to receive the connector formed as a female connection. As such, main controller 18 is configured to identify which of the plurality of first hoses (not shown) 670 are coupled to the plurality of second plurality of hoses through the interaction of port 15 and the connector. In addition, main controller 18 is further configured to identify the location of the coupling without specifically shaped connections such that SCD assemblies 14 coupled to pump hosing 560, 660 may be identified even when ports 15 are similarly shaped. As such, sequential compression therapy may be maintained on a patient positioned on the bed 512, 612 during transport of bed 512, 612.

As mentioned above, the pump housing 560, 660 is formed to house pump 562, 662. Pump 562, 662 is configured to be controlled by user inputs into GUI 76 such that pump actuation, pressure increase, pressure decrease, and identification of reaching a predetermined threshold are determined by the user inputs. In addition, the power and control circuitry (not shown) of pump 562, 662 is positioned along the power and control circuitry (not shown) of bed 512, 612 and couples to main controller 18. Such circuitry of pump 562, 662 is utilized to control pump 562, 662 as mentioned above.

Figure 14:
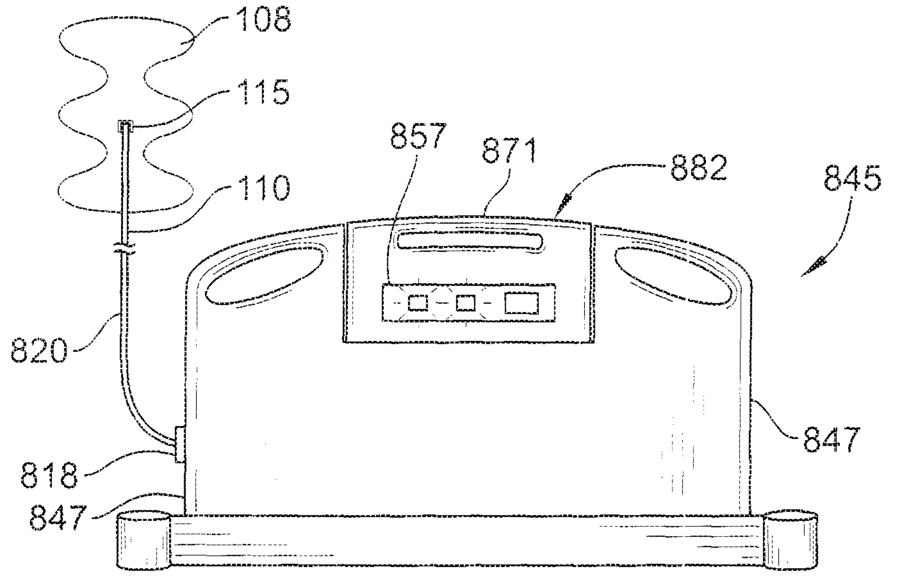
FIG. 14 is a rear elevation view of another embodiment of a bed similar to the embodiment shown in FIG. 1, FIG. 14 showing a footboard having the source of pressurized air for the pneumatic therapy device coupled thereto and having a panel accessible by the caregiver while the patient is positioned on the patient support apparatus.
Figure 15:
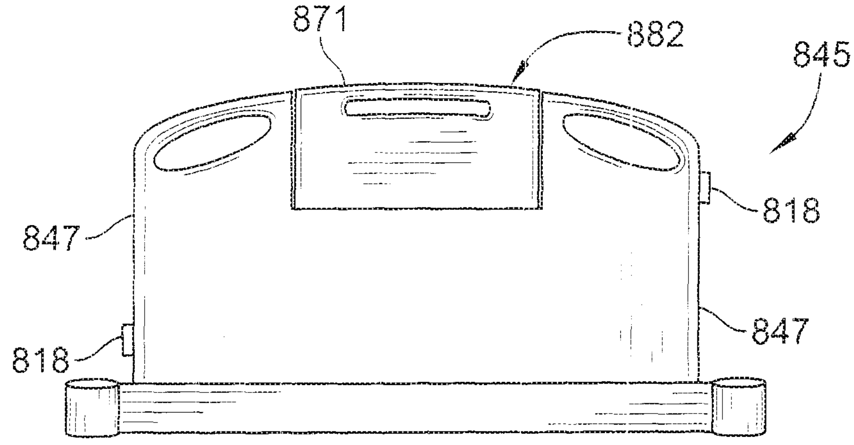
FIG. 15 is a rear elevation view of the footboard of FIG. 14 showing the footboard receiving a modular source of pressurized air for the pneumatic therapy device and having a cover removeably coupled thereto when the source of pressurized air for the pneumatic therapy device is removed therefrom.
Figure 16:
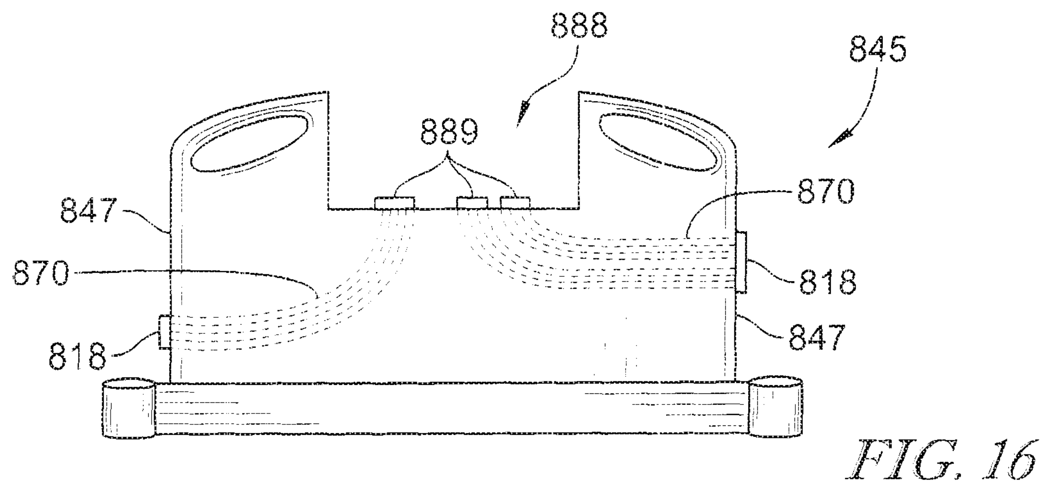
FIG. 16 is a rear elevation view of the bed of FIG. 15 showing the footboard configured to receive the modular source of pressurized air for the pneumatic therapy device.

In some embodiments, source of pressurized air 882 is modular and configured to be positioned in a recess 888 formed in footboard 845, as shown in FIGS. 14-16. Footboard 845 may be removeably coupled to source of pressurized air 882 located within recess 888, as shown in FIG. 14, may be removeably coupled to a cover 847 without source of pressurized air 882 positioned within recess 888, as shown in FIG. 15, or uncoupled to either source of pressurized air 882 or cover 847, as shown in FIG. 16. Illustratively, footboard 845 shown in FIGS. 14-16 is formed to include a plurality of pneumatic and electronic connectors, hoses, and cables 889 configured to couple to source of pressurized air 882. Cover 847 is formed to include a handle 871 and is removeably coupled to footboard 845 to conceal the pneumatic and electronic connectors, hoses, and cables 889 formed therein. As such, cover 847 may be removed from footboard 845 to expose pneumatic and electronic connectors, hoses, and cables 889 such that source of pressurized air 882 may be coupled to pneumatic and electronic connectors, hoses, and cables 889. Illustratively, main controller 18 is configured to identify the coupling of air source 882 to the pneumatic and electronic connectors, hoses, and cables 889 and control the desired therapy via user inputs. Further, main controller 18 is configured to identify the removal of air source 882 from the pneumatic and electronic connectors, hoses, and cables 889 and halt the therapy to SCD assemblies 14 coupled thereto.

Figures 17, 18:
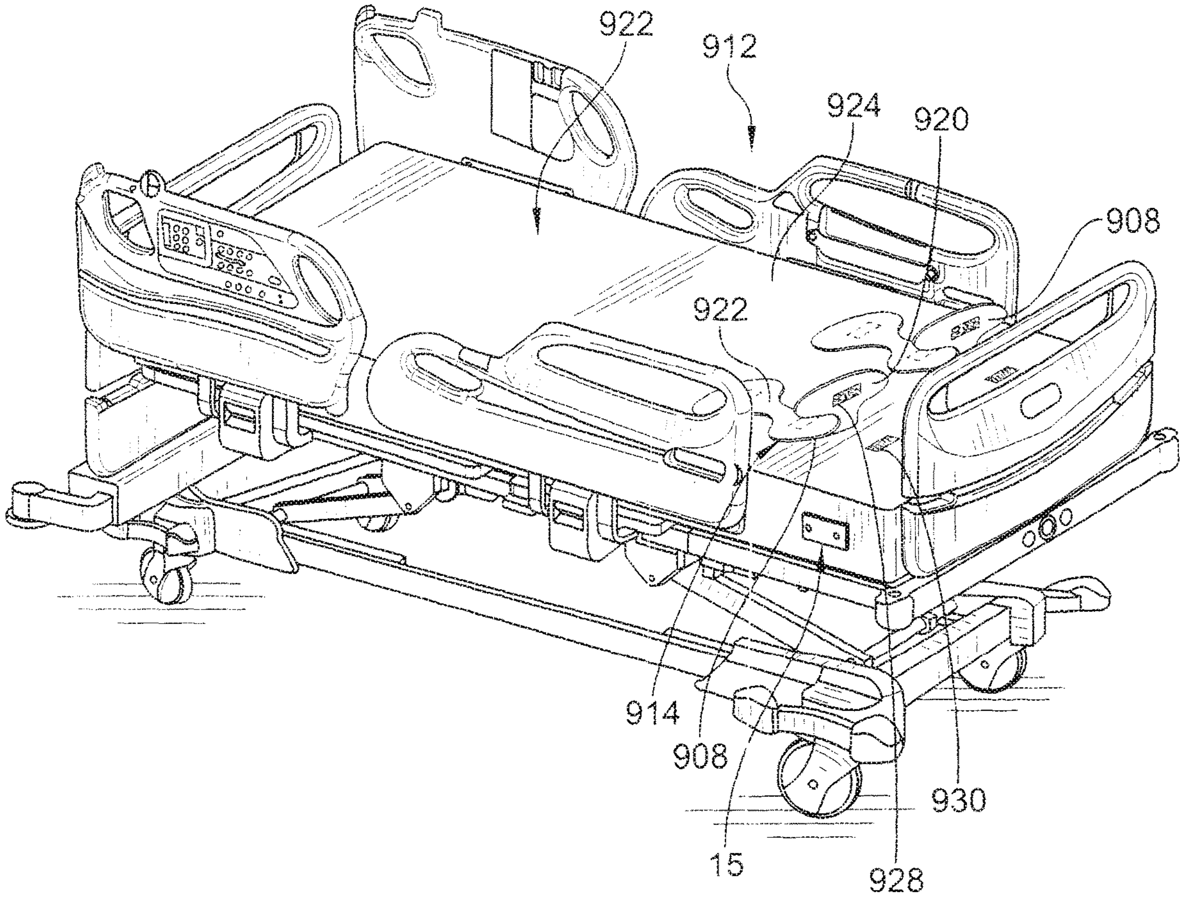
FIG. 17 is a front plan view of a status board in communication with any of the embodiments of the bed of FIG. 1.
FIG. 18 is a perspective view of an alternative embodiment of the bed of FIG. 1 showing a pair of sleeves removeably coupled to the patient support surface and configured to couple to an air source to provide pneumatic therapy.

Upon coupling source of pressurized air 882 to footboard 845, the electronic connectors 889 are configured to communicate to main controller 18 that air source 882 is installed. Main controller 18 is configured to communicate this information to user interface 70 and/or another communication interface 178, such as the NAVICARE® caregiver interface available from Hill-Rom, Inc. of Batesville, IN so that the data is displayed at caregiver's station 176 and at user interface 70 to indicate the location of source of pressurized air 882, as shown in FIG. 17. Other methods of identifying the location of source pressurized air 882 include using RTLS (real-time location system) tags affixed directly to source of pressurized air 882 which permits the caregiver to locate and track source of pressurized air 882 via an independent RTLS system.

As shown in FIGS. 14-16, footboard 845 may further include a panel 875 configured to display indicators concerning the status of source of air 882. Footboard 845 is further formed to include a first plurality of hoses 870 extending between source of air 882 and at least one lateral side 847 of footboard 845. Hoses 870 extend through at least one lateral side of footboard 845 and terminates at a port 818 configured to couple to a second plurality of hoses 820 at a connector 881 formed therein. SCD assembly 14 is configured to couple to connector 881 and receive pressurized air from source of air 882. In some embodiments, SCD assembly 14 couples directly to port 15.

In further embodiments, patient support apparatus 912 is formed to include a mattress 922 having a support surface 924 configured to removeably couple to a portion of SCD assembly 914, as shown in FIG. 18. Illustratively, support surface 912 is formed to include a portion of a coupling mechanism (not shown) such as a portion of hook and loop material or other methods of removable coupling known in the art. Each sleeve 908 is formed to include an outer surface 920 configured to face away from the patient and an inner surface 922 configured to contact the patient positioned on support surface 912. Outer surface 920 of each sleeve 908 is formed to include a first portion of the coupling mechanism or fastener 928 that mates with a second portion of the coupling mechanism/fastener 930 formed on support surface 912. As such, sleeves 908 are configured to move independent of support surface 912 such that patients of varying heights may be accommodated and movement of the patient positioned on support surface 912 is not inhibited. Sleeves 908, therefore, are configured to be mechanically detached from support surface 912 for a variety of reasons such as, but not limited to, to prevent restraint of the patient positioned thereon, removal of sleeves 908 for cleaning and/or maintenance, removal of sleeves 908 when not in use/when needed for use with a different support surface 912. Illustratively, sleeves 908 are formed form a cleanable and reusable material, and support surface 912 has source of pressurized air 58 positioned therein to which sleeves 908 are pneumatically coupled.

Such pneumatic coupling is achieved by coupling the first end 112 of least one hose 66 to connector 115 formed in each sleeve 908 and further coupling the second end 114 of hose 66 to port 15 formed in mattress 912. Port 15 couples distribution manifold 60 to sleeves 908 and guides pressurized air from source of pressurized air 58 into sleeves 908. In some embodiments, sleeves 908 are further formed to include a plurality of air bladders 924 positioned therein and in communication with source of pressurized air 58 such that the plurality of air bladders 924 are configured to inflate/deflate independent of each other in response to main controller 18. As such, air bladders 924 are configured to position the limbs of the patient positioned on support surface 912 in response to user inputs or a preprogrammed algorithm. Further, due to variations in patient limb length, air bladders (not shown) may be selectively inflated/deflated such that only the air bladders in contact with the patient receive pressurized air throughout therapy.

Figure 19:
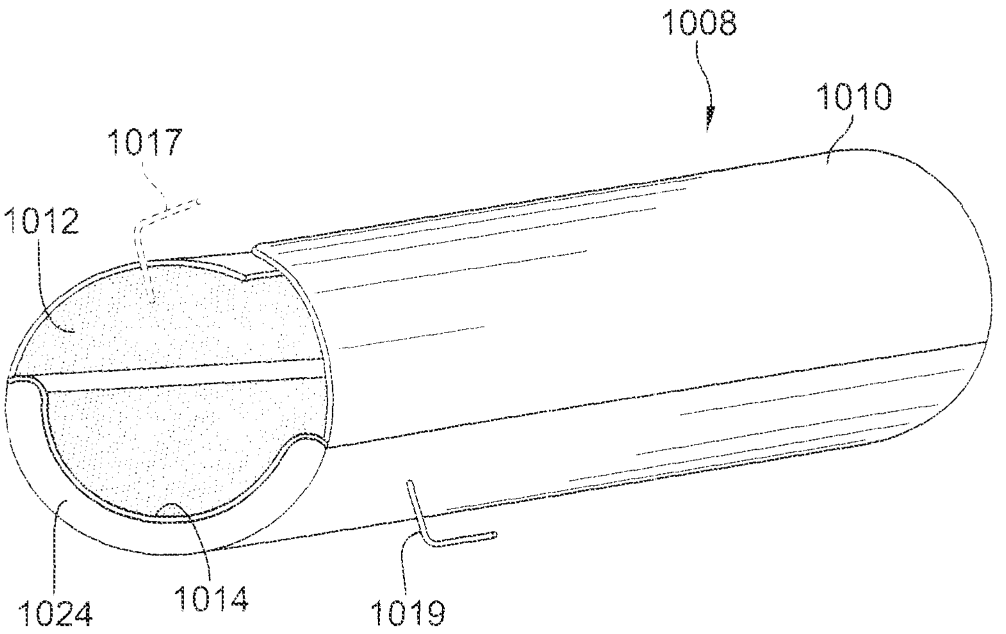
FIG. 19 is a cross-sectional view of an additional embodiment of a sleeve of the pneumatic therapy device of FIGS. 1 and 2 showing the sleeve lined with porous material, a port formed in the sleeve and configured to couple to a source of pressurized air for the pneumatic therapy device, and an optional port formed in the sleeve and configured to couple to an air source for the bed.
Figure 20:
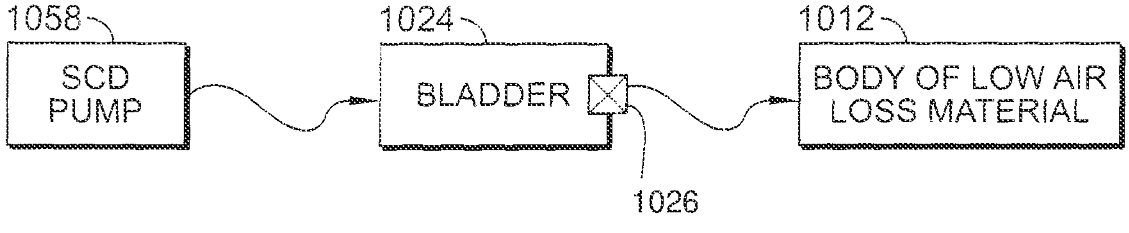
FIG. 20 is a block diagram showing the communication between the air source and the low air-loss material forming the sleeve of the pneumatic therapy device coupled thereto.

In some embodiments of sleeves 1008, sleeves 1008 are formed to have an exterior surface 1010 facing away from the patient positioned on patient support apparatus 12, a body 1012 spaced apart from exterior surface 1010 and formed from low-air-loss material, and a liner surface 1014 positioned therebetween and formed from porous material, as shown in FIGS. 19 and 20. At times, sleeves 1008 may be uncomfortable and/or overheat the patient when coupled to the patient. As such, sleeves 1008 are configured to cool the patient positioned on patient support surface 22 due to the low air-loss material forming sleeves 1008 and the porosity of liner surface 1014. Illustratively, such cooling is accomplished through use of a second connector 1017 formed in each sleeve 1008 and configured to couple to a second conduit (not shown) such that sleeve 1008 is in communication with source of pressurized air 58. Source of pressurized air 58 is configured to produce and guide pressurized air towards sleeve 1008 through second conduit 1018. Upon reaching sleeve 1008, the pressurized air enters body 1012 formed from low air-loss material such that the pressurized air flows through body 1012 along sleeve 1008 positioned on patient's limb and is configured to wick away heat and/or moisture therefrom.

In another embodiment of sleeves 1008, a first connector 1019 is used for both therapy and cooling of the patient's limbs as shown in FIGS. 19 and 20. Illustratively, a first conduit (not shown) is coupled to first connector 1019 and extends between source of pressurized air 1058 and at least one of the pluralities of air bladders 1024. The at least one of the pluralities of air bladders 1024 is formed to include a check valve 1026 configured to block pressurized air from exiting air bladder 1024 until pressure of pressurized air surpasses the threshold of check valve 1026. Once the threshold is surpassed, check valve 1026 opens into body 1012 formed from low air-loss material. As such, illustratively, pressurized air formed in source of pressurized air 58 is directed from source 58 to air bladder 1024, through check valve 1026, and into body 1012 of low air-loss material.

In still other embodiments of sleeves 1008, body 1012 may be lined with/formed from breathable wicking material in place of a low air-loss material as shown in FIG. 19. Such materials include mesh, wicking sportswear, and other materials known to a person of ordinary skill in the art. In still other embodiments of sleeves 1008, body 1012 may further include an inner surface 1028 configured to engage the patient positioned on patient support 12 and formed from a fabric to reduce skin irritation. Illustratively, such fabric includes silk like fabrics and other smooth materials known in the art. Further, inner surface 1028 is sized to enclose a portion of body 1012 whether body 1012 is formed from low air-loss material, breathable wicking material, or some combination thereof. Inner surface 1028 is sized to extend the length of sleeve 1008, illustratively, such that inner surface 1028 engages the skin of the limb positioned within sleeve 1008.

In some embodiments, therapy system 10 further includes an incontinence detection pad (not shown) positioned on patient support surface 22 and configured to detect incontinence of the patient positioned thereon. Incontinence pad further includes a sensor 64 and is in communication with main controller 18 such that upon identifying incontinence, sensor 64 communicates this information to main controller 18. Main controller 18 is configured to interpret this data and stop the prescribed therapy in response. Main controller 18 may further communicate an alert to the caregiver to check if sleeves 108 are wet. Upon confirming that sleeves 108 are dry, the caregiver inputs this information into user interface 70 or remote/caregiver communication device 176 and main controller 18 is configured to restart the desired therapy.

In other embodiments, therapy system 10 may further include, in combination with or independent of incontinence detection pad, a vitals monitor (not shown) positioned on patient support surface 22 and configured to detect vital signs of patient positioned thereon. Illustratively, vitals monitor is wireless, in communication with main controller, and configured to measure the heart rate and respiration rate of the patient before therapy, throughout therapy, and/or after therapy. These vitals are conveyed to main controller 18, and main controller 18 is configured to compare them to the pre-programmed threshold, known resting heart rate and respiration rate of the patient and/or pre-programmed threshold. A rapid heart rate and/or shortness of breath may indicate a possible DVT, and, as such, main controller 18 is configured to modify the therapy in response to a violation of the pre-programmed threshold and/or pre-programmed, known vitals. Vitals monitor may be further configured to notify the caregiver of a violation one or more of the aforementioned pre-programmed limitations via an alert communicated to remote/caregiver communication device 176.

In other embodiments, vitals monitor may be configured to measure heart rate and respiration rate and convey such data to main controller 18. Illustratively, the conveyance would be wireless although it may be achieved wired as well. Main controller 18 is configured to receive and interpret the patient's heart rate and respiration rate. The heart rate and respiration of the patient may indicate a blood clot if it such measurements exceed the pre-programmed threshold of the main controller 18, and, as such, main controller 18 is configured to increase the sequential compression therapy provided to the patient. With an increase of the sequential compression therapy, there is an increased likelihood of blood clot avoidance.

In additional embodiments, mattress 22 further includes an immersion sensor 89 positioned therein and configured to indicate when a patient positioned thereon is properly immersed in mattress 22 so to optimally relieve pressure on the patient. Illustratively, plurality of air bladders 924 are also positioned within mattress 22 and cooperate with immersion sensor 89 and main controller 18 to determine if the patient's immersion drops below or exceeds the pre-programmed optimal immersion level. Immersion sensor 89 is, illustratively, in wireless communication with main controller, and configured to measure immersion level of the patient. The immersion level measurement is conveyed to main controller 18, and main controller 18 is configured to compare them to the pre-programmed, known optimal immersion level of the patient and/or pre-programmed threshold before therapy, throughout therapy, and/or after therapy. Optimal immersion occurs when the mattress 22 is not so under-inflated that the person "bottoms out", i.e. their body is supported directly by the chair or bed, rather than being directly supported by the cushion of air, but not so over-inflated that the surface area of the cushion area supporting the body is small and hard, such that the pressure per unit area exerted upon the body is high. Optimal immersion allows the spreading of pressure over a greater area of the anatomy to prevent pressure sores. Immersion sensor 89 may be further configured to notify the caregiver of a violation of one or more of the aforementioned pre-programmed limitations via an alert communicated to remote/caregiver communication device 176.

In further embodiments, patient support apparatus 12 is configured to display a variety of data visually to the caregiver using physical indicators (not shown) formed therein and/or projections (not shown) projecting from patient support apparatus 12 onto a surface of the patient room. Physical indicators may be formed in footboard 45, headboard 46, siderail assemblies 78, and/or some combination thereof. Further, the projections originate from a projector (not shown) coupled to/formed in patient support 12 such that the projections are visible by a caregiver. Illustratively, projections are positioned on a floor of the patient room. Such projections and indicators display patient bed exit, vitals, patient support brake status, patient support height, some combination thereof, and/or other measurements of the patient.

In still additional embodiments, a wound therapy device (not shown) is positioned on or coupled to patient support apparatus 12. Such devices include a wound vacuum or negative pressure wound therapy (NPWT) system, other wound therapy devices known in the art, or some combination thereof. These devices may be in wireless communication with main controller 18 and are configured to communicate data from the wound therapy device to main controller 18. Main controller 18 is configured to interpret this data, compare it to a pre-programmed threshold, determine if it exceeds this threshold, adjust the wound therapy device in response to the aforementioned determination, and, optionally, notify the caregiver of the threshold violation.

In other embodiments, patient support 12 further includes a coverlet (not shown) positioned thereon or coupled thereto. Illustratively, coverlet is formed from spacer material and configured to function as microclimate management (MCM). A coverlet having MCM functionality may be accomplished as disclosed in U.S. Patent Application Publication Number 2018/0289 174 to Ye et al. and assigned to Hill-Rom Services, Inc. which is incorporated by reference herein. Illustratively, coverlet is pneumatically coupled to an MCM source of pressurized air 57 and formed to have s spacer layer which contains 3-dimensional (3D) engineered material therein and having a low air-loss (LAL) feature. Pressurized air from source 57 may be cooled before by a chiller (not shown) prior to entering coverlet and flowing through spacer layer. Such air flow through spacer layer wicks away excess moisture produced by patient and cools the patient's skin to increase patient comfort and avoid pressure ulcers.

In further embodiments, sleeves 108 may be formed to have a spacer layer (not shown) similar to the spacer layer of the coverlet described above. Illustratively, pressurized air from source 57 is guided to sleeves 108 and sequentially applies compression therapy unto the limbs of the patient positioned therein. Such pressurized air may also be directed into the spacer layer of sleeve 108 such that the same flow of pressurized air is shared between the therapy function and MCM function of sleeve 108. In other embodiments, two separate and distinct flows of pressurized air are produced by source 57 and guided to sleeve independent of the other. In still further embodiments, spacer layer is independent of sleeve 108 and configured to be placed either between sleeve 108 and patient or around an outside surface of sleeve 108. As described above, the pressurized air flow guided into spacer layer wicks away excess moisture produced by patient and cools the patient's skin to increase patient comfort and avoid pressure ulcers.

In some embodiments, a temperature sensor 89 is coupled to patient support 12 and/or sleeve 108 and is in wireless communication with main controller 18. Temperature sensor 89 is configured to communicate temperature data from patient support 12 and/or sleeve 108 to main controller 18. Main controller 18 is configured to receive and interpret this temperature data, compare it to a pre-programmed threshold, determine if the temperature exceeds this threshold, adjust the temperature of patient support apparatus 12 and/or sleeve 108 in response to the aforementioned determination, and, optionally, notify the caregiver of the threshold violation. Adjustment of temperature may be accomplished by decreasing the temperature of the patient support apparatus 12 and/or sleeve 108 by using a spacer layer with MCM functionality as described above, other cooling methods known in the art, and/or some combination thereof. Further, increasing the temperature of patient support apparatus 12 and/or sleeve 108 may be accomplished by a heating device coupled thereto, other heating methods known in the art, and/or some combination thereof.

In additional embodiments, main controller 18 is configured to suspend therapy for a desired amount of time. The length of suspension may be pre-programmed into main controller 18 upon exceeding a threshold of temperature, pressure, vitals, and/or other sensed data. Further, the length of suspension may be in response to a user input via user interface 70, remote computers/caregiver controller 176, and/or in-room computers 181. The caregiver may desire to suspend therapy for a variety of reasons including, but not limited to, exiting of the bed by the patient, cycling of therapy sessions, and/or exercising of the patient while in patient support apparatus 12.

In further embodiments, patient support apparatus 12 may be portable between patient rooms/houses. Illustratively, portable siderail assemblies (not shown) are formed to include port configured to receive second end 113 or connector of conduit 110. Similar to therapy system 10 described above, source of pressurized air 58 may be used to articulate head end 24 of patient support apparatus 12. In view of the portability of such siderail assemblies, patient support apparatuses 12 used therewith are often a patient's personal, home mattress/bed (not shown) and, as such, allow for the at home use of sequential compression device system 14, illustratively.

In other embodiments, a sleep sensor 89 63 is positioned beneath/coupled to patient support 12 and/or sleeve 108 and is in wireless communication with main controller 18. Sleep sensor 89 is configured to communicate patient movement/pressure, patient vitals, temperature, pulse oximetry, or some combination thereof to main controller 18. Main controller 18 is configured to receive and interpret this data, determine a sleep score/measurement using the data, compare it to a pre-programmed sleep score threshold (i.e.: a threshold at which the patient is at risk of experiencing sleep apnea), determine if the sleep score exceeds the threshold, actuate or adjust the sleep apnea therapy and/or adjust/stop the sequential compression therapy in response to the aforementioned determination, and optionally, notify the caregiver of the threshold violation. In other algorithms, main controller 18 is configured to identify particular marker data combinations commonly associated with a sleep apnea event (i.e.: rapid spike in blood pressure). Such a warning may optionally be communicated to the caregiver controller/remote computer 176 via an alert from main controller 18. Further, main controller 18 is configured to identify when a patient is about to fall asleep and/or is falling asleep based on the data from the sleep sensors 89 and reduce the sequential compression therapy to a pre-programmed minimum or stop the SCD assembly 14 altogether. Such a pre-programmed minimum may be identified as a sleep mode and may be activated by a caregiver/user from user interface 70 and/or caregiver controller/remote computer 176 via a sleep mode button/marker/logo.

In some embodiments, patient support 12 may further include a universal serial bus (USB) charging port (not shown) configured to supply power to devices coupled thereto from patient support apparatus 12. The USB charging port may further be configured to charge source of pressurized air 58 such that a source independent of patient support apparatus 12 may be charged using electricity flowing from a power source 190 to patient support apparatus 12 and, optionally, stored therein.

In additional embodiments, sensors 64 may be used to predict a bed exit by the patient using a bed exit sensor system. The bed exit sensor system may use a variety of sensors 64 measuring patient movement/pressure, vitals, temperature, and/or oxygen saturation of the patient's blood. Data measured by sensors 64 is conveyed to main controller 18. Main controller 18 is configured to receive and evaluate the data to determine a bed exit risk score. This score is compared to a pre-programmed bed exit threshold, and if the score exceeds the threshold, the patient is likely to exit the patient support apparatus 12, and main controller 18 communicates to air system controller 62 to stop any active sequential compression therapy. Further, conduit 110 may be configured to auto disconnect from connector 115 coupled to sleeve 108 and/or port 15 coupled to port 15 formed in patient support 12 in response to a communication of a bed exit risk from main controller 18.

In further embodiments, communication interface 178 (i.e.: NAVICARE®) is configured to wirelessly communicate with patient support apparatus 12, thereby allowing the caregiver to remotely control features of patient support apparatus 12 through caregiver controller 176. Such features include actuation/adjustment of SCD assembly 14 and/or other therapies coupled to patient support apparatus 12. In addition, the caregiver may access error logs, including SCD assembly 14 error logs, remotely via the wireless connection. Further, caregiver controller 176 is configured to display safety icons and fall risks and convey changes in status to the caregiver via the safety icons, fall risks, and/or alerts from main controller 18. Commonly, patients deemed a fall risk or other risk indicate that sequential compression therapy is likely needed. An alert concerning the possible need of SCD assembly 14 is conveyed to caregiver controller 176 and/or nurses' station 176 indicating that the patient positioned on patient support apparatus 12 is at risk. Upon coupling patient to SCD assembly 14 and actuation sequential compression therapy, the status of SCD assembly 14 and patient is conveyed to caregiver controller 176 and/or nurses' station 176. Patient support apparatus 12 may further be configured to wirelessly (i.e.: via Bluetooth) communicate with caregiver controller 176. As such, patient may actuate a nurse call button (not shown) on patient support apparatus 12 and/or user interface 70 which communicates an alert to caregiver controller/nurses' station Deep vein thrombosis may also be detected by swelling of the patient's limbs. As such, displacement of one of the plurality of air bladders (not shown) of sleeve 108 indicates possible swelling, and therefore, possible deep vein thrombosis. In some embodiments, to determine the displacement of an air bladder of sleeve 108, main controller 18 is configured to measure the time it takes for each of the air bladders to reach the desired pressure threshold and compare each new inflation time to the previous inflation time of the respective air bladder. If the new inflation time is less than the previous inflation time, then swelling is possible, and main controller 18 is further configured to communicate an alert to the caregiver controller/nurses' station 176 and/or user interface 70 indicating that a possible deep vein thrombosis.

In some embodiments, possible swelling of the patient's limbs may be accomplished using a movement sensor (i.e.: accelerometer) 64 coupled to or positioned in sleeve 108. Movement of sleeve 108 indicates possible swelling of the patient's limbs and such data is conveyed to main controller 18. Main controller 18 is configured to have a preprogrammed threshold of movement of sleeve 108 such that upon receiving and evaluating data, main controller 18 is configured to compare the measured movement to the preprogrammed threshold. If the measured movement exceeds the preprogrammed threshold, then main controller 18 conveys an alert to the caregiver via caregiver controller 176 and/or user interface 70 conveying the possible need for sequential compression therapy in light of the limb swelling.

Additional signs of deep vein thrombosis include a decrease in the oxygenation of the blood of the patient as well as a decrease in the pulse in the limb of the patient. In some embodiments, at least one of the varieties of sensors 64 includes a pulse oximeter configured to determine the oxygen saturation of the patient's blood and convey the level of oxygen saturation to main controller 18. In other embodiments, the vitals sensor 89 measures and conveys the pulse of the patient's leg to main controller 18. In still further embodiments, both the oxygen saturation and the pulse of the leg are conveyed to the main controller 18. The main controller 18 of any of the above embodiments is configured to receive data from the pulse oximeter and/or vitals sensor 89 and compare the measured data to a preprogrammed threshold of the oxygen saturation level and limb pulse, respectively. If either measurement has fallen below the preprogrammed threshold, then main controller 18 communicates an alert to caregiver controller 176 and/or user interface 70 indicating the need for sequential compression therapy via SCD assembly 14.

In some embodiments, the pulse of the limb of the patient is determined using wireless Doppler ultrasound (not shown) coupled to the limb of the patient and configured to measure the heartrate of the patient's limb. The main controller 18 is configured to receive data from the ultrasound and compare the measured data to a preprogrammed threshold of limb pulse. If the pulse has fallen below the preprogrammed threshold, then main controller 18 communicates an alert to caregiver controller 176 and/or user interface 70 indicating the need for sequential compression therapy via SCD assembly 14.

In additional embodiments, patient support apparatus 12 may further include exercise devices (not shown) configured to removeably couple thereto. Exercise devices include, but are not limited to a sliding bed deck (not shown) and/or a spring loaded footboard (not shown). The sliding bed deck is configured to move between a first position in which the patient is relaxed and the bed deck is biased and a second position in which the patient is pushing the sliding bed deck away from headboard 46 against the biasing member (not shown). The spring loaded footboard is configured to move between a first position in which the patient is relaxed and the footboard is biased and a second position in which the patient is pushing the footboard away from the headboard 46 against the biasing member (not shown). Patient support apparatus 12 may further couple to other exercise devices known in the art.

In some embodiments, sleeve 108 is a smart boot sleeve and is configured to measure a variety of patient vitals and supplemental measurements. Illustratively, smart boot (not shown) removeably couples to a mini pump (not shown) configured to house source of pressurized air 58 and power source 190. Smart boot 108 wirelessly communicates with main controller 18 of patient support apparatus 12 to convey data for interpretation and, when needed, conveyance of alerts to a caregiver. As such, smart boot 108 and mini pump 58 are configured to removeably couple to patient support apparatus 12 and may be transported between patient beds.

In some embodiments, patient support apparatus 12 is a maternity bed having a removable mid-section (not shown) and a pair of stirrups (not shown) extending from a bottom surface of the mid-section. In other embodiments, patient support apparatus 12 is a stretcher having a frame (not shown) formed to include port 15 and port 15 extending therefrom. Port 15 is configured to couple to SCD assembly 14 and, thereby, provide sequential compression therapy to the patient positioned on patient support apparatus 12. In further embodiments, patient support apparatus 12 is an operating table having a frame (not shown) formed to include port 15 and port 15 extending therefrom. Patient support apparatus 12 may further have siderail assemblies 78, 80 formed to include port 15 and port 15 extending therefrom. As discussed above, coupler is configured to couple to SCD assembly 14.

Illustratively, at least two air hoses 59 are routed to each of the pair of edges 31, 33 and terminate at a port 15 formed in each of the edges 31, 33 and having a port 15 extending therefrom. Port 15 is configured to couple to SCD assembly 14 and, thereby, guide pressurized air into SCD assembly 14 during therapy.

Although certain illustrative embodiments have been described in detail above, variations and modifications exist within the scope and spirit of this disclosure as described and as defined in the following claims.

The invention claimed is:

1. A therapy system comprising a pneumatic therapy device including a compression sleeve and a conduit having a first end coupled to the compression sleeve and a second end, a patient support apparatus, the patient support apparatus including a frame, a source of pressurized air supported by the frame, a distribution assembly including a conduit for directing a flow of pressurized air from the source of pressurized air, an outlet, and a sensor for detecting a pressure, a user interface supported on the frame, a controller including a processor and a memory device, the memory device including instructions that are executable by the processor to control the source of pressurized air, distribution system, and user interface, the instructions operable to detect that the second end of the conduit of the pneumatic therapy assembly has been connected to the outlet of the distribution assembly and provide an interface screen on the user interface to allow a user to control of the source of pressurized air to operate the pneumatic therapy device to provide therapy to an occupant of the patient support apparatus, wherein the compression sleeve includes an exterior surface, a body formed of low air-loss material configured to flow the pressurized air through the body and a liner of porous material to allow air to enter the porous material and cool a patient's skin while applying compression therapy, wherein the compression sleeve comprises a bladder, the conduit coupled to a bladder inlet, and a check-valve coupled to a bladder outlet located inside the compression sleeve, the check-valve configured to block pressurized air from exiting the bladder and in fluid communication with the low air-loss material such that once a threshold pressure of the check-valve is reached, the check-valve permits a flow of pressurized air to exit the bladder into the body formed of the low air-loss material, and wherein the check-valve is not coupled to the conduit for directing the flow of pressurized air from the source of pressurized air.

2. The therapy system of claim 1, wherein the outlet of the distribution assembly is positioned on an edge of the frame of the patient support apparatus.

3. The therapy system of claim 1, wherein the patient support apparatus further comprises a mattress and the outlet of the distribution assembly is positioned on an edge of the mattress of the patient support apparatus.

4. The therapy system of claim 1, wherein the instructions in the memory device include instructions that, when executed by the processor, cause the controller to monitor the sensor for detecting a pressure in the distribution assembly to detect that the second end of the conduit of the therapy device has been connected to the outlet.

5. The therapy system of claim 4, wherein the patient support apparatus further comprises a sensor operable to detect a token coupled to the second end of the conduit of the pneumatic therapy device to determine the type of therapy device coupled to the outlet of the air distribution assembly.

6. The therapy system of claim 1, wherein the patient support apparatus further comprises a sensor operable to detect a token coupled to the second end of the conduit of the pneumatic therapy device to determine the type of therapy device coupled to the outlet of the air distribution assembly.

7. The therapy system of claim 1, wherein the memory device includes instructions that, when executed by the processor, cause the controller to monitor the pressure in the pneumatic therapy device at pre-determined intervals of time, determine if the measured pressure is greater than a pre-programmed threshold, and if the pressure exceeds the pre-programmed threshold, records a violation in the patient record, and decreases the pressure by a predetermined value.

8. The therapy system of claim 7, wherein the memory device includes further instructions that, when executed by the processor, cause the controller to transmit an alert to a caregiver providing an indication of the violation of the pre-programmed threshold.

9. The therapy system of claim 7, wherein the memory device includes further instructions that, when executed by the processor, cause the controller to monitor the sensor for detecting a pressure in the distribution assembly to detect that the second end of the conduit of the therapy device has been disconnected from the outlet.

10. The therapy system of claim 9, wherein the memory device includes further instructions that, when executed by the processor, cause the controller to transmit an alert to a caregiver providing an indication of the conduit is disconnected.

11. The therapy system of claim 1, wherein the memory device includes further instructions that, when executed by the processor, cause the controller to monitor the sensor for detecting a pressure in the distribution assembly to detect that the second end of the conduit of the therapy device has been disconnected from the outlet.

12. The therapy system of claim 11, wherein the memory device includes further instructions that, when executed by the processor, cause the controller to transmit an alert to a caregiver providing an indication of the conduit is disconnected.

13. The therapy system of claim 1, wherein the patient support apparatus includes a scale system and the memory device includes instructions that, when executed by the processor, modify an operating parameter of the pneumatic therapy device based on a weight of a patient on the patient support apparatus as detected by the scale system.

14. The therapy system of claim 1, wherein the patient support apparatus is in communication with a communication interface that communicates data regarding an operation of the pneumatic therapy device to a computer spaced apart from the patient support apparatus.

15. The therapy system of claim 1, wherein the air distribution assembly includes a manifold that is positioned on the frame of the patient support apparatus.

16. The therapy system of claim 1, wherein the source of pressurized air is positioned on the frame and enclosed by a mattress.

17. The therapy system of claim 1, wherein the source of pressurized air is positioned on the frame and at least a portion of the source of pressurized air is positioned in a mattress supported on the frame.

18. The therapy system of claim 1, wherein the source of pressurized air is positioned in a footboard positioned on the frame of the patient support apparatus.

19. The therapy system of claim 1, wherein the source of pressurized air is removeably coupled to a footboard positioned on the frame of the patient support apparatus.

20. The therapy system of claim 19, wherein the outlet of the air distribution assembly is positioned on an edge of the footboard.

21. The therapy system of claim 20, wherein the air distribution assembly is contained within the footboard.

22. A therapy system comprising:

a pneumatic therapy device including a compression sleeve and a conduit having a first end coupled to the compression sleeve and a second end, wherein the compression sleeve includes an exterior surface, a body formed of low air-loss material configured to flow pressurized air through the body, and a liner of porous material to allow air to enter the porous material and cool a patient's skin while applying compression therapy and wherein the compression sleeve comprises a bladder, the conduit coupled to a bladder inlet, and a check-valve coupled to a bladder outlet, the check-valve configured to block the pressurized air from exiting the bladder and in fluid communication with the low air-loss material such that once the threshold pressure of the check valve is reached, the check-valve permits a flow of pressurized air to exit the bladder and feed the low air-loss material, and wherein the check-valve is not coupled to the conduit for directing the flow of pressurized air from the source of pressurized air.

* * * * *